US011237025B2

United States Patent
Issa et al.

(10) Patent No.: US 11,237,025 B2
(45) Date of Patent: Feb. 1, 2022

(54) DISTRIBUTED OPTICAL SENSING SYSTEMS AND METHODS

(71) Applicant: TERRA15 PTY LTD, Perth (AU)

(72) Inventors: Nader Issa, Inglewood (AU); Michael Alberic Freddy Roelens, Glendalough (AU); Steven James Frisken, Vaucluse (AU)

(73) Assignee: TERRA15 PTY LTD, Western (AU)

( * ) Notice: Subject to any disclaimer, the term of this patent is extended or adjusted under 35 U.S.C. 154(b) by 105 days.

(21) Appl. No.: 16/633,706

(22) PCT Filed: Jul. 26, 2018

(86) PCT No.: PCT/AU2018/050775
§ 371 (c)(1),
(2) Date: Jan. 24, 2020

(87) PCT Pub. No.: WO2019/018894
PCT Pub. Date: Jan. 31, 2019

(65) Prior Publication Data
US 2020/0209020 A1 Jul. 2, 2020

(30) Foreign Application Priority Data
Jul. 26, 2017 (AU) .............................. 2017902938

(51) Int. Cl.
*G01D 5/353* (2006.01)
(52) U.S. Cl.
CPC ................ *G01D 5/35361* (2013.01)

(58) Field of Classification Search
CPC ........... G01D 5/35361; G01D 5/35358; G01D 5/35354; G01D 5/35306
See application file for complete search history.

(56) References Cited

U.S. PATENT DOCUMENTS

| | | | |
|---|---|---|---|
| 6,459,486 B1 | 10/2002 | Udd et al. |
| 6,490,045 B1 | 12/2002 | Dakin et al. |
| 7,995,197 B2 | 8/2011 | Sikora et al. |
| 8,670,662 B2 | 3/2014 | Healey et al. |
| 10,650,648 B2 | 5/2020 | Englund |
| 10,950,102 B2 | 3/2021 | Englund |

(Continued)

FOREIGN PATENT DOCUMENTS

| CN | 1 837 674 | 9/2006 |
|---|---|---|
| CN | 1837674 A | 9/2006 |

(Continued)

OTHER PUBLICATIONS

IP Australia, Examination Report No. 1 for Standard Patent Application, dated Jan. 28, 2021 issued in foreign counterpart, Australian Patent Application No. 2018308947.

(Continued)

*Primary Examiner* — Thanh Luu
(74) *Attorney, Agent, or Firm* — Gottlieb, Rackman & Reisman, P.C.

(57) ABSTRACT

A distributed optical detection system comprising: a broadband optical source; and a phase and amplitude receiver for measuring phases and amplitudes of distributed backscattered signals from a sensing medium. Methods of quantitatively sensing optical path length changes along a sensing medium in a distributed manner are also disclosed.

25 Claims, 16 Drawing Sheets

(56) References Cited

U.S. PATENT DOCUMENTS

| | | |
|---|---|---|
| 2008/0278711 A1 | 11/2008 | Sikora et al. |
| 2009/0135428 A1 | 5/2009 | Healey et al. |
| 2009/0263069 A1 | 10/2009 | Hartog |
| 2010/0220317 A1 | 9/2010 | Lewis et al. |
| 2011/0310378 A1 | 12/2011 | Froggatt et al. |
| 2015/0308864 A1 | 10/2015 | Paulsson et al. |
| 2016/0146661 A1 | 5/2016 | Martin et al. |
| 2017/0138785 A1 | 5/2017 | Tadakuma |
| 2017/0268944 A1* | 9/2017 | Nunes .................. E21B 47/12 |

FOREIGN PATENT DOCUMENTS

| | | |
|---|---|---|
| EP | 1496723 B1 | 1/2005 |
| WO | 2016144336 | 9/2016 |
| WO | 2017/087792 A1 | 5/2017 |

OTHER PUBLICATIONS

P. Rajeev et al.; Distributed Optical Fibre Sensors and Their Applications in Pipeline Monitoring;Key Engineering Materials vol. 558 (2013) pp. 424-434; © (2013) Trans Tech Publications, Switzerland doi:10.4028/www.scientific.net/KEM.558.424.

Fotech; Pipeline Integrity Monitoring with DAS; Protecting your Pipeline Assets with LIvePIPE®; 2015 Fotech Solutions Ltd.; smart pipe rev2 2016;FotechSolutions.com.

Gregory Duckworth et al.;OptaSense® distributed acoustic and seismic sensing using COTS fiber optic cables for Infrastructure Protection and Counter Terrorism; Sensors, and Command, Control, Communications, and Intelligence (C3I) Technologies for Homeland Security and Homeland Defense XII; edited by Edward M. Carapezza, Proc. of SPIE vol. 8711, 87110G— © 2013 SPIE; CCC code: Proc. of SPIE vol. 8711 87110G-1Downloaded From: http://proceedings.spiedigitallibrary.org/ on Aug. 1, 2013 Terms of Use: http://spiedl.org/terms.

William Blewett; OPTASENSE;Monash Freeway Project 2015;wmblewett@qinetiq.com.au;www.OptaSense.com.

Arch Owen et al; OptaSense; Fibre Optic Distributed Acoustic Sensing for Border Monitoring; 2012 European Intelligence and Security Informatics Conference; © 2012 IEEE; DOI 10.1109/EISIC.2012.59.

Clive Kessel; Acoustic sensing the future for rail monitoring? The Rail Engineer • Apr. 2014.

ISA/AU, PCT International Search Report and Written Opinion dated Oct. 2, 2018 issued in PCT International Application No. PCT/AU2018/050775 filed Jul. 26, 2018.

Supplementary European Search Report for Corresponding Appln. EP 1883 7622 dated Jul. 7, 2020.

* cited by examiner

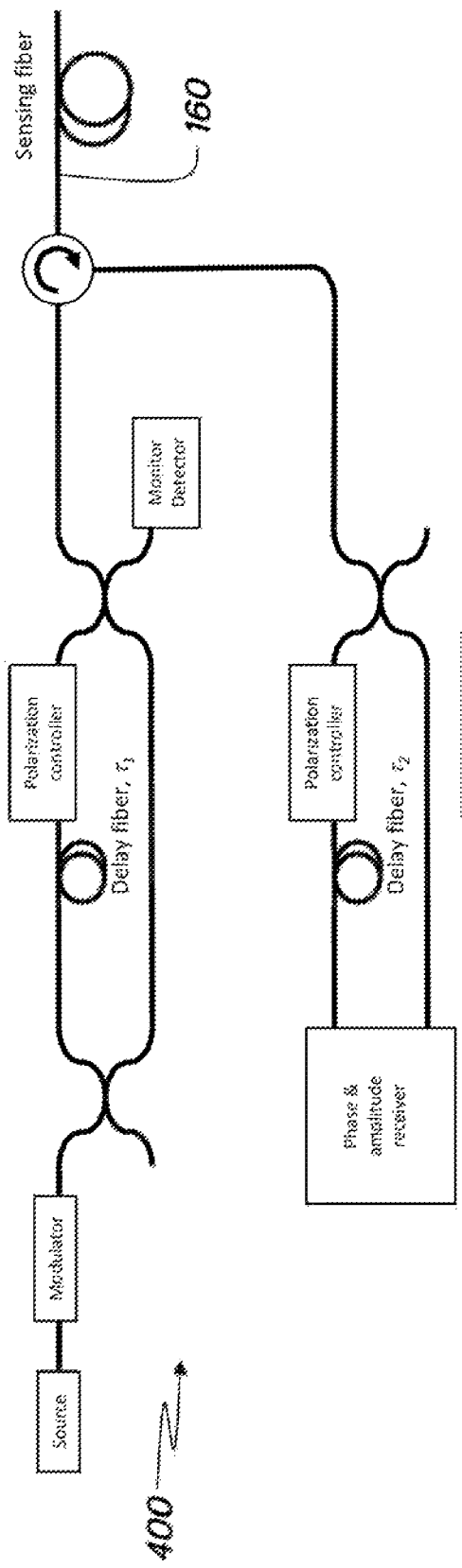
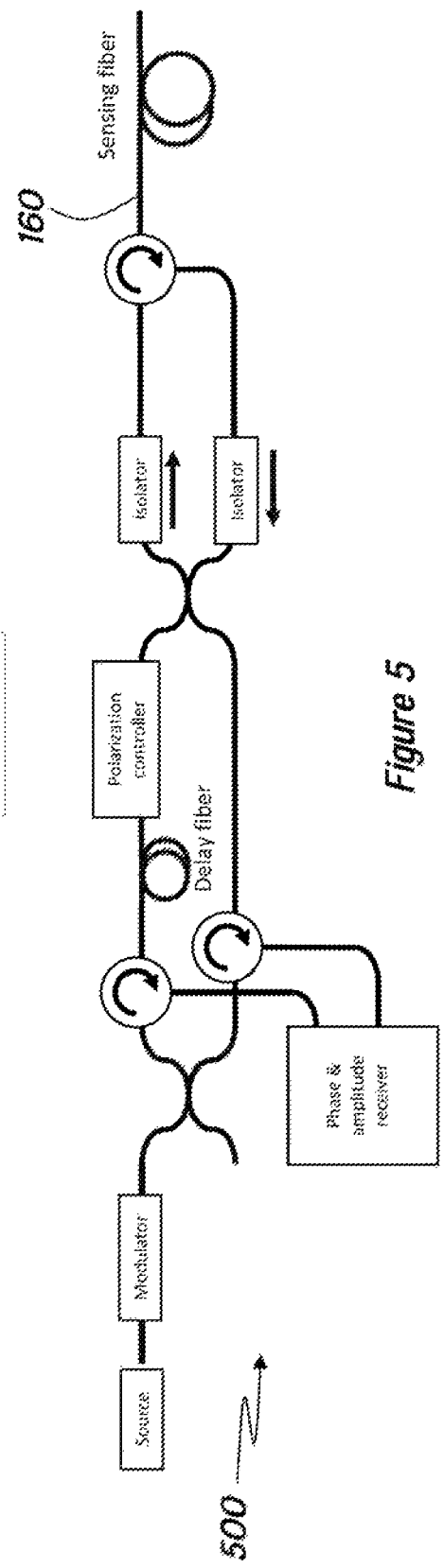
*Figure 4*
*Figure 5*

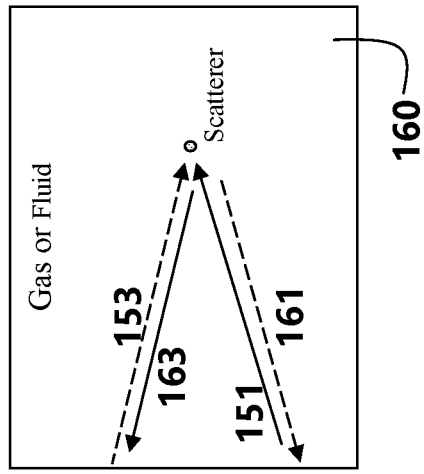
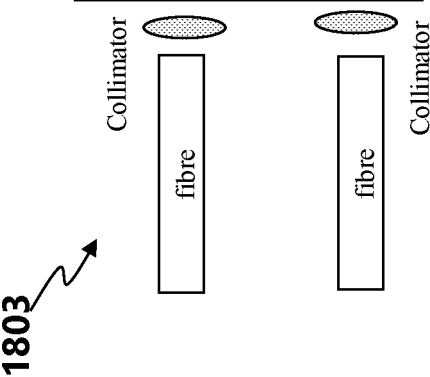
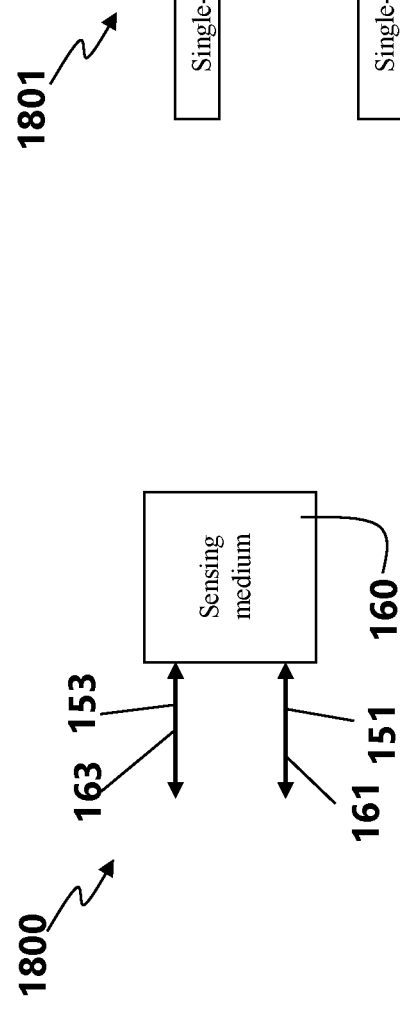
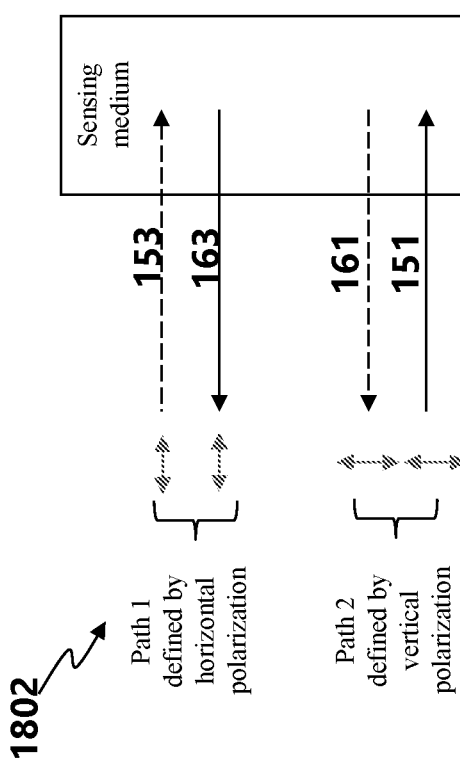

DISTRIBUTED OPTICAL SENSING SYSTEMS AND METHODS

CROSS-REFERENCE TO RELATED APPLICATIONS

This application is the United States National Stage entry under 35 U.S.C. 371 of PCT/AU2018/050775, filed Jul. 26, 2018, which in turn claims the priority of Australian Patent Application No. 2017902938, filed Jul. 26, 2017, the contents of each of which are hereby incorporated by reference in their entirety.

FIELD OF THE INVENTION

The present invention relates to systems and methods for quantitative and distributed measurement of optical path length changes in an optically transparent medium and in particular to systems and methods for quantitative and distributed measurement of optical phase variations along an optical path in an optically transparent medium.

The invention has been developed primarily for use in methods and systems for quantitative and distributed sensing of optical path length changes along an optical fibre caused by acoustic, elastic, seismic, vibrational, thermal or kinetic energy and will be described hereinafter with reference to this application. However, it will be appreciated that the invention is not limited to this particular field of use.

BACKGROUND

Any discussion of the background art throughout the specification should in no way be considered as an admission that such background art is prior art, nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

In the application of disturbance detection for perimeter or infrastructure security, the detection and location (without quantitative measurement) of only a single point of disturbance is often required. U.S. Pat. No. 7,995,197 B2 to Sikora discloses a continuous wave, incoherent light source used for detecting a singular disturbance on an optical fibre, without teaching how to locate the point of disturbance along the fibre. U.S. Pat. No. 8,670,662 B2 to Healey expands upon Sikora's teachings, by suggesting how such a singular disturbance may be located through means of frequency modulation. Both Sikora and Healey, however, rely exclusively on detecting an intensity variation of backscattered light to detect a disturbance, using only one intensity detector which is incapable of directly measuring phase. There is a highly non-linear and non-unique relationship between the size of a disturbance on a fibre and the resulting intensity fluctuation. It is therefore not possible to accurately and unambiguously measure optical path length change (or other physical parameters such as strain) in practical operation. Furthermore, Sikora proposes distinguishing between multiple disturbances using their unique spectral signatures. This requires prior knowledge of disturbances in order to locate multiple disturbances. Thus the methods taught by Sikora and Healey do not provide a means of distributed sensing, for example, measuring multiple optical path length changes within a sensing medium.

Sagnac-based fibre sensing systems, as taught in U.S. Pat. No. 6,459,486 B1 to Udd and European Patent No. EP1496723 B1 to Vakoc, for example, can operate with broadband or incoherent light sources. However, they rely on bidirectional or counter-propagating optical paths to exploit the Sagnac effect and are not obviously extended to distributed backscattering situations; where access to both ends of the sensing fibre is not provided.

More recently, other applications such as seismic or acoustic wave recording have required advanced system designs to enable quantitative, highly sensitive and distributed measurement of fibre strain changes along a fibre. Applications of this technology have included: seismic profiling at oil and gas fields; micro-seismicity monitoring during hydraulic fracture reservoir stimulation; geotechnical ground surveys; and fluid flow measurement. The advancements in technology to enable these applications has resulted in higher cost and complexity of the systems being used.

Distributed acoustic sensing (DAS), also known as distributed vibration sensing, is a method of using Rayleigh backscattering from an optically transparent medium, typically an optical fibre, to measure small changes in the physical properties of an optical fibre along the entire length of the fibre in a distributed manner.

In general, using an optical fibre (with or without the protection of a cable jacket) as a distributed sensor can replace many point sensors. As a result, it can be the most cost effective, and weight and space efficient sensor system available, as it only requires one fibre capable of sending, receiving and sensing the signal from the same fibre and only one monitor is adequate to display the local changes in temperature, stress, vibration and acoustic energy. In addition, optical fibres are well adapted to operating in harsh environments, high temperatures and are immune from damage or noise induced by electromagnetic interference. This considerable light weight advantage makes distributed sensors based on distributed light scattering in optical fibre amongst the most versatile monitoring option even in comparison to point fibre sensors, especially for monitoring of long linear assets, such as pipelines, wells, railways, roads, conveyors, bridges, tunnels, buildings and fences.

Known DAS systems work by coupling highly coherent (narrow-band) laser energy pulses into optical fibre and analysing Rayleigh backscatter that results from microscopic imperfections and inhomogeneities in the optical fibre. Light pulses, as they travel from the input along the fiber to the far (distal) end, reflect off these microscopic imperfections/inhomogeneities. Such interactions cause a small amount of light to backscatter and return to the input end where they are detected and analysed. Acoustic waves, when interacting with the materials that comprise the optical fibre, create elongations in the microscopic structure, as well as small changes in refractive index. These changes affect the backscatter characteristics, becoming detectable events. Using time-domain techniques, event location is precisely determined, providing fully distributed sensing with resolution of 1 meter or less.

DAS differs from conventional distributed strain sensing in that it does not use the non-linear Brillouin backscattering to achieve a measurement. This enables very sensitive, linear and fast distributed measurements. For example, sub-nanometre strain sensitivity, at measurement rates higher than 2 kHz and spatial resolutions shorter than 10 m can be achieved with DAS.

However, all the previous DAS systems suffer from the same disadvantage that the coherence length, and associated phase noise, of the optical source is a major factor in limiting the signal-to-noise of the system and thereby limiting sensitivity. Thus, for DAS over large distances, the optical source used for the system must have a highly narrowband (narrow linewidth), and thus very high coherence length, to permit the forward and backward propagating light to interfere and produce the interference signal used to perform the analysis of the return signal. In some DAS systems, the coherence length can be as high as many 10s of kilometres to enable analysis of the Rayleigh backscattered signal over practical distances. Of course, requiring the source optical signal to satisfy such high coherence length parameters, adds significant complexity and cost to the overall DAS system.

A further disadvantage of existing DAS systems is a limit on the optical power that may be delivered to the sensing medium (e.g. an optical fibre) before non-linear interactions between the forward propagating light and the sensing medium itself, which, can limit the optical power which can propagate beyond 10s or 100s of meters or introduce phase and intensity modulations which corrupt the Rayleigh backscatter signal. A typical non-linear effect in optical fibres is the so-called modulation instability, which can induce a position-dependent signal fading in long-range DAS systems. This fading leads to a complete masking of the interference signal at some positions and therefore to a loss of sensitivity at those positions. Another typical non-linear effect in optical fibres that can be particularly limiting is Brillouin scattering, which can exhibit an appreciable effect resulting in loss of the Rayleigh backward propagating signal at input power levels as little as 100 mW. Since the Rayleigh backscatter is a very weak phenomenon, this directly limits the sensitivity of the system, by limiting the amount of optical power that can be used in the sensing fibre.

The currently employed methods of DAS are based on coherent optical time domain reflectometry (c-OTDR) or coherent optical frequency domain reflectometry (c-OFDR). In both these methods, narrowband lasers with a significantly high degree of temporal coherence are used (narrowband). Depending on the variant of the method, the coherence length can be larger than 10 m, but is often much larger than this and often much larger than 100 km.

Generally, in c-OTDR and c-OFDR, low coherence of the laser impacts directly and negatively on the phase noise of the measurement and therefore severely limits the sensitivity of the system. Furthermore, in many embodiments, particularly those involving heterodyne detection with a local oscillator, a very high degree of coherence is essential to enable a long measurement range, since the coherence length of the laser directly determines the maximum length of the sensing fibre.

On the other hand, high coherence of the laser typically results in higher costs, higher complexity and poor system robustness during transportation or operation in uncontrolled environments. Vibration of the source or system can severely hinder system performance. Furthermore, narrowband/narrow-linewidth and thus, highly coherent, laser sources suffer from lower non-linear thresholds in optical fibre, such as stimulated Brillouin scattering, four-wave mixing and modulation instability, which limit the optical power that can be launched into the fibre. The coherence requirements on the source also make it difficult to modulate the source directly without worsening the coherence. Thus, external modulators are required which adds to the cost and complexity of the system.

Yet another limitation of using nearly monochromatic or coherent light sources for DAS is that the Rayleigh backscatter from an optical fibre exhibits random amplitude variations along the fibre. At locations of relatively low or zero amplitude (known as signal fading), the phase is inaccurately measured or undefinable, respectively. This is a significant source of error in coherent optic al-time-domain-reflectometry (c-OTDR) and coherent optical-frequency-domain-reflectometry c-OFDR systems and negatively impacts system sensitivity. To overcome this limitation, multiple high-coherence laser sources at different frequencies are simultaneously used in a system so that their signals can be combined in a manner to mitigate fading as taught by A. H. Hartog et al. in the paper "The use of multi-frequency acquisition to significantly improve the quality of fibre-optic distributed vibration sensing", Geophysical Prospecting Vol 66, Issue Si, (2017). Multiple high-coherence sources and multiple frequencies introduces significant cost and complexity to DAS systems.

Therefore there is a need for a truly distributed sensing system and methods for querying and detecting multiple optical path length changes in a medium with improved noise rejection capability, increased disturbance location accuracy, improved immunity to vibration, improved robustness, stability and reliability and with minimal system cost and complexity.

Definitions

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below.

Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of". "Consisting essentially of," when used in the claims, shall have its ordinary meaning as used in the field of patent law.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

As used herein in the specification and in the claims, the phrase "broadband source" in relation to an electromagnetic wave source is used to mean a source producing an electromagnetic wave comprising more than one frequency. The frequencies in a broadband source can be continuous in a range of frequencies or discrete or a combination of both. The frequencies in the broadband source may have a random or undefined phase relationship (i.e. incoherent or partially coherent), such as: the Amplified Spontaneous Emission (ASE) of an amplifier; an SLED; a multi-mode laser; or the combined output of multiple independent lasers. A broadband source may also have a defined or fixed phase relationship between the frequencies (i.e. coherent), as would be expected from: a mode-locked laser; an amplitude modulated laser; a polarization modulated laser; or a frequency/phase modulated laser.

As used herein in the specification and in the claims, the phrase "phase and amplitude receiver" is used to describe a receiver system (or "phase and amplitude measurement" is used to describe a receiving method) which is capable of accurately measuring and outputting the following 2 parameters: the difference in phase (with full quadrature determination, i.e. without ambiguity in a range of $2\pi$ radians) between 2 electromagnetic wave inputs (for example, optical inputs); and the amplitude of the interference between 2 electromagnetic wave inputs (for example, optical inputs).

As used herein in the specification and in the claims, the phrase "optical frequencies" is used to describe frequencies in the range from $1\times10^{13}$ Hz to $3\times10^{15}$ Hz. An "optical source" is a source of electromagnetic energy at optical frequencies.

SUMMARY OF THE INVENTION

It is an object of the present invention to overcome or ameliorate at least one or more of the disadvantages of the prior art, or to provide a useful alternative.

The present invention relates to a method of quantitative and distributed measurement of optical path length changes in an optically transparent medium such as, for example, along an optical fibre. Multiple physical parameters may be sensed by the consequential optical path length changes they create, which may include; longitudinal strain, transverse strain, acoustic waves, seismic waves, vibration, motion, bending, torsion, temperature, optical delay and chemical composition. Any other physical parameter having a mechanism which induces elongation and/or refractive index change and/or deformation along an optical path can also be sensed. Optical path length changes can also occur by the movement of scattering/reflecting particles in the sensing medium. Embodiments of the invention disclosed herein use an intensity modulated (or pulsed) broadband light source in conjunction with delays and accurate phase and amplitude measurement on the distributed backscatter from an optically transparent sensing medium, for example an optical fibre.

According to a first aspect of the invention, there is provided a distributed optical sensing system. The system may comprise a broadband optical source. The system may further comprise a phase and amplitude receiver.

According to a particular arrangement of the first aspect, there is provided a distributed optical sensing system comprising: a broadband optical source; and a phase and amplitude receiver. The broadband optical source may have a coherence time, $\tau_{coh}$ and, interchangeably, a coherence length, $l_{coh}$.

The coherence length, $l_{coh}$, may be less than 1 m, less than 50 cm, less than 10 cm, less than 9 cm, less than 8 cm, less than 7 cm, less than 6 cm, less than 5 cm, less than 4 cm, less than 3 cm, less than 2 cm, less than 1 cm, less than 9 mm, less than 8 mm, less than 7 mm, less than 6 mm, less than 5 mm, less than 4 mm, less than 3 mm, less than 2 mm, less than 1 mm, less than 0.9 mm, less than 0.8 mm, less than 0.7 mm, less than 0.6 mm, less than 0.5 mm, less than 0.4 mm, less than 0.3 mm, less than 0.2 mm, less than 0.1 mm, or less than 0.05 mm, less than 0.04 mm, less than 0.03 mm, less than 0.02 mm, less than 0.01 mm, less than 0.005 mm, less than 0.004 mm, less than 0.003 mm, less than 0.002 mm, or less than 0.001 mm.

For example, in certain arrangements, the coherence length, $l_{coh}$, may be about 0.001 mm, 0.002 mm, 0.003 mm, 0.004 mm, 0.005 mm, 0.006 mm, 0.007 mm, 0.008 mm, 0.009 mm, 0.01 mm, 0.015 mm, 0.02 mm, 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.2 mm, 0.3 mm, 0.4 mm, 0.5 mm, 0.6 mm, 0.7 mm, 0.8 mm, 0.9 mm, 1 mm, 0.12 mm, 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, 9 cm, 0.1 m, 0.2 mm 0.3 m, 0.4 m, 0.5 m, 0.6 m, 0.7 m, 0.8 m, 0.9 m, or 1 m.

The bandwidth of the broadband optical source, may be between about 10 MHz to 100 MHz, 100 MHz to 1 GHz, 1 GHz to 10 GHz, 10 GHz to 100 GHz, 100 GHz to 1 THz, 1 THz to 10 THz, 10 THz to 100 THz. That is: 10 MHz to 100 THz (i.e. $10 \times 10^6$ Hz to $100 \times 10^{12}$ Hz)

For example, in certain arrangements, the bandwidth of the broadband optical source, may be about 10 MHz, 15 THz, 20 MHz, 25 MHz, 30 MHz, 35 MHz, 40 MHz, 45 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 10 GHz, 15 GHz, 20 GHz, 25 GHz, 30 GHz, 35 GHz, 40 GHz, 45 GHz, 50 GHz, 60 GHz, 70 GHz, 80 GHz, 90 GHz, 100 GHz, 200 GHz, 300 GHz, 400 GHz, 500 GHz, 600 GHz, 700 GHz, 800 GHz, 900 GHz, 1 THz, 1.5 THz, 2 THz, 2.5 THz, 3 THz, 3.5 THz, 4 THz, 4.5 THz, 5 THz, 5.5 THz, 6 THz, 6.5 THz, 7 THz, 7.5 THz, 8 THz, 8.5 THz, 9 THz, 9.5 THz, 10 THz, 15 THz, 20 THz, 25 THz, 30 THz, 35 THz, 40 THz, 45 THz, 50 THz, 60 THz, 70 THz, 80 THz, 90 THz, or about 100 THz.

The phase and amplitude receiver may be adapted to receive distributed backscatter of optical signals generated by the optical source directed to a medium.

The broadband optical source may be either an incoherent or partially coherent broadband optical source. The broadband optical source may be a coherent broadband optical source.

The system may further comprise at least one Intentional Relative Delay Path (IRDP). The IRDP may be adapted to delay a portion of light generated by the optical source.

The optical source may be a modulated optical source. The modulated optical source may be an intensity modulated or pulsed optical source.

The system may further comprise a forward optical path adapted to receive output light generated by the optical source The system may further comprise a modulator adapted to modulate at least a portion of the light generated by the optical source in the forward optical path. The modulator may be adapted to modulate the intensity of at least a portion of the light in the forward optical path.

The modulator may be adapted to modulate the phase of at least a portion of the light in the forward optical path. The modulator may be adapted to modulate the polarisation of at least a portion of the light in the forward optical path. The modulator may be adapted to modulate the frequency of at least a portion of the light in the forward optical path.

The forward optical path may be further adapted to transmit the modulated output light to an optically transparent medium adapted to alter an optical signal in response to a physical change. The optically transparent medium may be adapted to disturb an optical signal propagating therein by modifying the path length of the optical signal in the medium. The path length may be an optical path length of the optical signal propagating in the medium.

The forward optical path may comprise an optical splitter adapted to divide the optical signal into at least two portions. The modulator may be adapted to receive one or both portions of the divided optical signal to provide at least one modulated optical signal.

The forward optical path may comprise a first optical delay means having a first delay, $\tau_1$. The forward optical path may be adapted to receive a first portion of the optical signal from the optical splitter. The forward optical path may be further adapted to subsequently transmit a delayed forward-propagating optical signal to the optically transparent medium.

The forward optical path may further comprise a direct optical transmission means adapted to receive a second portion of the intensity modulated optical signal from the optical splitter and subsequently transmit a direct forward-propagating optical signal to the optically transparent medium bypassing the first optical delay means. The delayed forward-propagating optical signal may be temporally delayed by the first delay, $\tau_1$, relative to the direct forward-propagating optical signal.

The system may further comprise a combining means for combining the direct forward-propagating optical signal and the delayed forward-propagating optical signal on to a common forward optical path. The system may further comprise an optical directing means adapted to receive backward propagating light from the optically transparent medium and directing the received backward propagating light to a return optical path. The return optical path may comprise a return optical splitter adapted to divide the backward propagating light into at least two portions. The return optical path may further comprise a second optical delay means having a second delay, $\tau_2$. The second optical delay may be adapted to receive a first portion of the backward propagating light from the return optical splitter. The second optical delay may be further adapted to transmit a delayed return optical signal to the phase and amplitude receiver.

The system may further comprise a direct return optical transmission means adapted to receive a second portion of the backward propagating light from the return optical splitter. The direct return optical transmission means may be further adapted to subsequently transmit a direct return optical signal to the phase and amplitude receiver bypassing the second optical delay means. The delayed return optical signal may be delayed by the second delay, $\tau_2$, relative to the direct return optical signal.

The first optical delay means and the second optical delay means may be a common delay means having a delay, $\tau_{cont}$.

The system may comprise a first optical delay means. The system may comprise an optically transparent medium adapted to modify the path length of an optical signal in response to an external disturbance. The system may comprise an optical intensity modulation means to receive an optical output from the broadband optical source to provide an intensity modulated optical signal. The intensity modulated optical signal may be divided into two portions, wherein a first portion of the of the modulated optical signal may be directed to the first optical delay means to generate a delayed output signal and subsequently to the optically transparent medium, and wherein a second portion (a direct output signal) of the of the modulated optical signal may be directed directly to the optically transparent medium thereby bypassing the first optical delay means and experiencing a delay which is less than the delay experienced by the first portion of the modulated optical signal imparted thereon by the first optical delay means. The first portion of the modified optical signal which passes through the first optical delay means, is delayed with respect to the second portion of the modified optical signal.

The system may be adapted to receive a return optical signal from the optically transparent medium comprising a first backscattered optical signal arising from the first portion of the intensity modulated optical signal and a second backscattered optical signal arising from the second portion of the intensity modulated optical signal.

The system may comprise a second optical delay means.

The first backscattered optical signal may be divided into at least two portions, a first backscattered first portion and a first backscattered second portion. The first backscattered first portion may be directed to a second optical delay means such that it is temporally delayed with respect to the first backscattered second portion to generate a first delayed backscattered optical signal (arising from the first backscattered first portion) and a first direct backscattered optical signal (arising from the first backscattered second portion).

The second backscattered optical signal may be divided into at least two portions, a second backscattered first portion and a second backscattered second portion. The second backscattered first portion may be directed to the second optical delay means such that it is temporally delayed from the second backscattered second portion to generate a second delayed backscattered optical signal (arising from the first backscattered second portion) and a second direct backscattered optical signal (arising from the second backscattered second portion).

The system may further comprise a phase and amplitude receiver adapted to detect an interference signal between the first delayed backscattered optical signal and the second delayed backscattered optical signal to determine a phase variance between the first delayed backscattered optical signal and the second delayed backscattered optical signal indicative of an external disturbance causing an optical path difference in the optically transparent medium.

The transparent optical medium may be an optical fibre.

The first optical delay means may impart a temporal delay $\tau_1$ (relative to at least one other portion on the outgoing path) on an optical signal directed thereto. The second optical delay means may impart a temporal delay $\tau_2$ (relative to at least one other portion on the returning path) on an optical signal directed thereto.

The absolute difference between the temporal delays $\tau_1$ and $\tau_2$ from the first and second optical delay means may be less than the coherence time, $\tau_{coh}$, of the broadband optical source, i.e. $|\tau_1-\tau_2|<\tau_{coh}$. In alternate arrangements, the absolute difference between the temporal delays $\tau_1$ and $\tau_2$ from the first and second optical delay means may be less than a multiple, a, of the coherence time, $\tau_{coh}$, of the broadband optical source, i.e. $|\tau_1-\tau_2|<a\,\tau_{coh}$ where $|\tau_1-\tau_2|$ may be up to 100 times the coherence time, $\tau_{coh}$, i.e. $|\tau_1-\tau_2|<100\,\tau_{coh}$.

The broadband optical source may have a coherence time, $\tau_{coh}$. The coherence time may satisfy the relation $|\tau_1-\tau_2|<a\tau_{coh}$. The multiplication factor, a, may be about 1. The multiplication factor, a, may be between about 1 and about 100. The multiplication factor, a, may be between about 1 and about 2, between about 1 and about 3, between about 1 and about 4, between about 1 and about 5, between about 1 and about 6, between about 1 and about 7, between about 1 and about 8, between about 1 and about 9, or between about 1 and about 10, or between about 1 and about 20, or between about 1 and about 30, or between about 1 and about 40, or between about 1 and about 50, or between about 1 and about 60, or between about 1 and about 70, or between about 1 and about 80, or between about 1 and about 90, or between about 1 and about 100, or between about 10 and about 20, or between about 20 and about 30, or between about 30 and about 40, or between about 40 and about 50, or between about 50 and about 60, or between about 60 and about 70, or between about 70 and about 80, or between about 80 and about 90, or between about 90 and about 100. Multiplication factor, a, may be about 1, 2, 3, 4, 5, 6, 7, 8, 9, 10, 20, 30, 40, 50, 60, 70, 80, 90, or about 100.

The delay $\tau_1$ and/or $\tau_2$ may be greater than the round trip time of the optical signal from the optical source to the distal end of the optically transparent medium and back again. In alternate arrangements, the delay $\tau_1$ and/or $\tau_2$ may be less than the round trip time of the optical signal (i.e. from the optical source to the distal end of the optically transparent medium and back again).

The forward optical path may comprise an optical splitter adapted to divide the optical signal into at least two portions. The modulator may be adapted to receive one or both portions of the divided optical signal to provide at least one modulated optical signal.

The forward optical path may comprise a first optical delay means having a first delay, $\tau_1$, and adapted to receive a first portion of the optical signal from the optical splitter and subsequently transmit a delayed forward-propagating optical signal to the optically transparent medium. The forward optical path may further comprise a direct optical transmission means adapted to receive a second portion of the intensity modulated optical signal from the optical splitter and subsequently transmit a direct forward-propagating optical signal directly to the optically transparent medium bypassing the first optical delay means; wherein the delayed forward-propagating optical signal is temporally delayed by the first delay, $\tau_1$, relative to the direct forward-propagating optical signal.

The system may further comprise an optical directing means adapted to receive backward propagating light from the optically transparent medium and directing the received backward propagating light to a return optical path. The return optical path may comprise a return optical splitter adapted to divide the backward propagating light into at least two portions. The return optical path may comprise a second optical delay means having a second delay, $\tau_2$. The second optical delay means may be adapted to receive a first portion of the backward propagating light from the return optical splitter and subsequently transmit a delayed return optical signal to the optical receiver. The return optical path may further comprise a direct return optical transmission means adapted to receive a second portion of the backward propagating light from the return optical splitter and subsequently transmit a direct return optical signal directly to the optical receiver bypassing the second optical delay means. The delayed return optical signal may be delayed by the first delay, $\tau_1$, relative to the direct return optical signal.

The first optical delay means and the second optical delay means may be common. The first optical delay means and the second optical delay means may be a common IRDP adapted to permit forward- and backward-propagating optical signals. Optical signals propagating in either direction through the common IRDP may experience a delay. The delay applied by the common IRDP to forward propagating optical signals may be different than the delay applied by the common IRDP to backward propagating optical signals.

The broadband optical source may have a coherence time, $\tau_{coh}$, and wherein $|\tau_1-\tau_2|<a\ \tau_{coh}$ wherein multiplication factor, a, may be between 1 and about 100. The delay of the first and second optical delay means respectively may satisfy the relations $\tau_1 > \tau_{coh}$ and $\tau_2 > \tau_{coh}$.

The phase and amplitude receiver nay be adapted to measure differences in phase of optical signals incident thereon. The optical receiver may receive a plurality of signals including: a Direct+Direct signal comprising a backward propagating signal arising from the direct forward-propagating optical signal having bypassed the second optical delay means (Signal 1); a Delay+Direct signal comprising a backward propagating signal arising from the delayed forward-propagating optical signal having bypassed the second optical delay means (Signal 2); a Direct+Delay signal comprising a backward propagating signal arising from the direct output signal having been transmitted through the second optical delay means (Signal 3); and a Delay+Delay signal comprising a backward propagating signal arising from the delayed output signal having been transmitted through the second optical delay means (Signal 4).

Signal 2 and Signal 3 may arrive at the optical receiver approximately at the same time to permit Signal 2 to interfere with Signal 3 thereby to generate an interference signal adapted to provide a measure of the optical path difference between Signal 2 and Signal 3 which is, in turn, indicative of the path length difference in the optical transparent medium caused by an external disturbance.

The first optical delay means and the second optical delay means may be a common delay means, having a delay, $\tau_{com}$. The common delay means may act as the first delay means for light propagating therethrough in a forward propagating direction. The common delay means may further act as the second delay means for light propagating therethrough in a backward propagating direction where $\tau_{com} > \tau_{coh}$.

The phase and amplitude receiver may be adapted to measure differences in phase and the interference amplitude of optical signals incident thereon. The phase and amplitude receiver may receive a plurality of signals including:
a Delay+Direct signal comprising a backward propagating signal arising from the delayed forward-propagating optical signal having bypassed the second optical delay means (Signal 2); and
a Direct+Delay signal comprising a backward propagating signal arising from the direct output signal having been transmitted through the second optical delay means (Signal 3).

Received signals Signal 2 and Signal 3 may arrive at the receiver approximately at the same time to permit Signal 2 to interfere with Signal 3 thereby to generate an interference signal adapted to provide a measure of the optical path difference between Signal 2 and Signal 3 which may be indicative of the path length difference in the optical transparent medium caused by an external disturbance.

The transparent optical medium may be an optical fiber.

The system may further comprise a computational and analysis means adapted to receive the output signals of the phase and amplitude receiver. The computation and analysis means may be further adapted to compute distributed optical path length changes in the transparent optical medium. The computational and analysis means may be adapted to infer physical changes in the transparent optical medium from the measured optical path length changes.

The system may further comprise a plurality of optically transparent mediums. The system may further comprise frequency selection means for selecting a plurality of frequency bands within each of the direct and delayed forward-propagating optical signals. Each selected frequency band may comprise forward-propagating direct and delayed optical signals being directed to a selected medium. The system may further comprise a plurality of receiving means for receiving backward-propagating optical signals from each selected optical medium. The system may further comprise frequency selection means for selecting a plurality of frequency bands within each of the direct and delayed return-propagating optical signals, each selected frequency band comprising return-propagating direct and delayed optical signals being directed to a selected phase and amplitude receiver; a plurality of phase and amplitude receivers adapted to measure differences in amplitude phase of the received optical signals in the selected frequency bands to determine optical path length changes along each selected mediums in a distributed manner to infer physical changes in the selected mediums.

According to a second aspect of the invention, there is provided a method of sensing optical path length changes along a sensing medium in a distributed manner. The method may comprise the step of providing a broadband optical source for generating an optical output. The optical source may have a coherence time, $\tau_{coh}$. The method may comprise the further step of separating the optical output into at least two portions and directing each separated portion to an independent forward optical path. The method may comprise the further step of providing a first optical delay means in a first of said optical paths, the delay means adapted to delay at least one portion of the optical output on the first forward optical path with respect to at least one other independent forward optical path by a predetermined delay time, $\tau_1$, thereby to produce a delayed optical output signal and at least one direct optical output signal. The method may comprise the further step of providing a directing device for directing the output signals into the sensing medium. The method may comprise the further step of providing a receiving means for receiving distributed backscatter signals from the sensing medium. The method may comprise the further step of separating the backscatter signals into at least two independent return paths. The method may comprise the further step of providing a second optical delay means in a first of said return paths, the delay means adapted to delay at least one portion of the received backscatter signals on the first return path with respect to at least one other return optical path by a predetermined delay time, $\tau_2$, thereby to produce a delayed backscatter signal and at least one direct backscatter signal. The method may comprise the further step of measuring the relative phase difference between the separated delayed and direct backscatter signals to determine optical path length changes along the sensing medium.

According to a particular arrangement of the second aspect of the invention, there is provided a method of sensing optical path length changes along a sensing medium in a distributed manner comprising the steps of: providing a broadband optical source for generating an optical output, the optical source having a coherence time, $\tau_{coh}$; separating the optical output into at least two portions and directing each separated portion to an independent forward optical path; providing a first optical delay means in a first of said optical paths, the delay means adapted to delay at least one portion of the optical output on the first forward optical path with respect to at least one other independent forward optical path by a predetermined delay time, $\tau_1$, thereby to produce a delayed optical output signal and at least one direct optical output signal; providing a directing device for directing the output signals into the sensing medium; providing a receiving means for receiving distributed backscatter signals from the sensing medium; separating the backscatter signals into at least two independent return paths; providing a second optical delay means in a first of said return paths, the delay means adapted to delay at least one portion of the received backscatter signals on the first return path with respect to at least one other return optical path by a predetermined delay time, $\tau_2$, thereby to produce a delayed backscatter signal and at least one direct backscatter signal; and measuring the relative phase difference between the separated delayed and direct backscatter signals to determine optical path length changes along the sensing medium.

The method may comprise the further step of inferring physical changes in the sensing medium from the sensed optical path length changes.

The optical source may a coherence time, $\tau_{coh}$. The delay of the first and second delay means may satisfy the relation $|\tau_1-\tau_2|<a\,\tau_{coh}$. The multiplication factor, a, may be about 1. The multiplication factor, a, may be between about 1 and about 100.

The broadband optical source may be either an incoherent or partially coherent broadband optical source. The broadband optical source may be a broadband coherent optical source. The optical source may be a modulated optical source or pulsed optical source.

The bandwidth of the broadband optical source, may be between about 10 MHz to 100 MHz, 100 MHz to 1 GHz, 1 GHz to 10 GHz, 10 GHz to 100 GHz, 100 GHz to 1 THz, 1 THz to 10 THz, 10 THz to 100 THz. That is: 10 MHz to 100 THz (i.e. $10 \times 10^6$ Hz to $100 \times 10^{12}$ Hz).

The method may comprise the further step of modulating either the optical output or the delayed and/or direct output signals prior to directing the output signals to the sensing medium.

The method may comprise the further step of, prior to directing the output signals into the sensing medium, providing combining means for combining the delayed output signal and the at least one direct output signal on to a common forward optical path.

The first optical delay means and the second optical delay means may be common.

The method may comprise the further step of determining the locations of the optical path length changes or a physical parameter using the travel time of light in the sensing medium and the modulation scheme. The method may comprise the further step of quantitatively determining optical path length changes in a distributed manner using the measured phase. The method may comprise the further step of inferring one or more physical parameters of the sensing medium from the determined optical path length changes.

The step of modulating may comprise either modulating the intensity, modulating the amplitude, modulating the frequency, modulating the phase, or modulating the polarisation of the optical signals. The modulation may be pulsed, thereby providing an intensity-modulated optical output.

The optical source may be a modulated optical source. The method may comprise the further step of modulating either the optical output or the delayed and direct output signals prior to directing the output signals to the sensing medium. The step of modulating may comprise either modulating the amplitude, modulating the frequency, modulating the phase, or modulating the polarisation of the optical signals. The modulation may be pulsed, thereby providing an intensity-modulated optical output.

The system may further comprise an optical re-combiner adapted to recombine the delayed optical signal and at least one direct output signal on to a common forward optical path for directing the output signals into the sensing medium The sensing medium may be an optically transparent medium at a predetermined wavelength or wavelengths of light generated by the optical source. The optically transparent medium may be an optical fiber or optical waveguide adapted for guiding light having the predetermined wavelength or wavelengths. The optically transparent medium may be water, sea water, fluid, glass, polymer, semiconductor material, air, methane, compressed natural gas, liquefied natural gas, gas, or other suitable optically transparent material.

The optically transparent medium may not be a guiding medium, wherein the method may further comprise the step of providing one or more collimators for substantially collimating the output signals the launching the collimated output signals into the sensing medium, the one or more collimators further for collecting backscattered optical signals from the sensing medium.

The method may comprise the further step of providing a first frequency selection means. The first frequency selection means may be adapted to select a plurality of frequency bands within each of the direct and delayed forward-propagating optical output signals. Each selected frequency band may comprise forward-propagating direct and delayed optical signals. The first frequency selection means may be adapted for directing each pair of optical signals in each selected frequency band to a selected one of a plurality of sensing mediums. The first frequency selection means may be adapted for receiving backward-propagating distributed backscatter optical signals from each selected optical medium. The first frequency selection means may be adapted for combining each of the received optical signals onto a common optical return path.

The method may comprise the further step of providing a second frequency selection means. The second frequency selection means may be adapted for receiving optical signals from the return paths. The second frequency selection means may be adapted for selecting a plurality of frequency bands with the received optical signals. The second frequency selection means may be adapted for directing signals within each selected plurality of frequency bands to a selected one of a plurality of phase and amplitude receivers to measure the relative phase difference between the delayed and direct backscatter optical signals in each selected frequency band to determine optical path length changes in each of the plurality of sensing mediums thereby to infer physical changes in each sensing medium.

The first frequency selection means may comprise an optical frequency demultiplexer and multiplexer. The second frequency selection means may comprise an optical demultiplexer.

Optical signals within multiple frequency bands selected by the frequency demultiplexer may each be directed to a unique phase and amplitude receiver. Optical signals within multiple selected frequency bands selected by the frequency demultiplexer may each be directed to a common phase and amplitude receiver.

According to a third aspect of the invention, there is provided a method of sensing optical path length changes along a sensing medium in a distributed manner. The method may comprise the step of providing a broadband light source. The method may comprise the further step of separating optical light output from the source into at least two output paths. The method may comprise the further step of delaying in the light in the one output path with respect to at least one other output path by a delay time, $\tau_1$. The method may comprise the further step of modulating the optical light at any step prior to directing the light from the different output paths into the sensing medium. The method may comprise the further step of directing the light from the different output paths into the sensing medium. The method may comprise the further step of receiving distributed backscatter from the sensing medium. The method may comprise the further step of separating the received backscatter into at least two return paths. The method may comprise the further step of delaying the light in one return path with respect to at least one other return path by a delay time, $\tau_2$. The method may comprise the further step of providing a phase and amplitude receiver for measuring the relative phase difference between the separated distributed backscattered light after delay.

According to a particular arrangement of the third aspect, there is provided a method of sensing optical path length changes along a sensing medium in a distributed manner comprising: providing a broadband light source; separating optical light output from the source into at least two output paths; delaying in the light in the one output path with respect to at least one other output path by a delay time, $\tau_1$; modulating the optical light at any step prior to directing the light from the different output paths into the sensing medium; directing the light from the different output paths into the sensing medium; receiving distributed backscatter from the sensing medium; separating the received backscatter into at least two return paths; delaying the light in one return path with respect to at least one other return path by a delay time, $\tau_2$; and providing a phase and amplitude receiver for measuring the relative phase difference between the separated distributed backscattered light after delay.

The method may comprise the further step of quantitatively determining optical path length changes in a distributed manner using the measured phase. The method may comprise the further step of determining the locations of the optical path length changes or one or more physical parameters causing optical path length changes in the sensing medium using the travel time of light in the sensing medium and the modulation scheme. The method may comprise the further step of inferring one or more physical parameters from the changes in optical path length.

The optical source may have a coherence time, $\tau_{coh}$. The delay of the first and second delay means may satisfy the relation $|\tau_1-\tau_2|<a\,\tau_{coh}$. The multiplication factor, a, may be about 1. The multiplication factor, a, may be between about 1 and about 100.

The broadband optical source may be either an incoherent or partially coherent broadband optical source. The broadband optical source may be a broadband coherent optical source.

The bandwidth of the broadband optical source, may be between about 10 MHz to 100 MHz, 100 MHz to 1 GHz, 1 GHz to 10 GHz, 10 GHz to 100 GHz, 100 GHz to 1 THz, 1 THz to 10 THz, 10 THz to 100 THz. That is 10 MHz to 100 THz (i.e. $10\times10^6$ Hz to $100\times10^{12}$ Hz).

The intensity or amplitude of light generated by the optical source may be modulated anywhere before the sensing medium. The frequency of light generated by the optical source may be modulated anywhere before the sensing medium. The phase of light generated by the optical source may be modulated anywhere before the sensing medium. The polarization of light generated by the optical source may be modulated anywhere before the sensing medium.

The method may comprise the further step of, prior to directing the output signals into the sensing medium, providing combining means for combining the delayed output signal and the at least one direct output signal on to a common forward optical path.

The first optical delay means and the second optical delay means may be common. The intensity or amplitude of light generated by the optical source may be modulated anywhere before the sensing medium. The frequency of light generated by the optical source may be modulated anywhere before the sensing medium. The phase of light generated by the optical source may be modulated anywhere before the sensing medium. The polarization of light generated by the optical source may be modulated anywhere before the sensing medium.

The method may comprise the further step of, prior to directing the output signals into the sensing medium, providing combining means for combining the delayed output signal and the at least one direct output signal on to a common forward optical path.

The first optical delay means and the second optical delay means may be common.

The phase and amplitude measurement may comprise the use of one or more of the group comprising: a phase and amplitude receiver; frequency shifting (e.g. acousto-optic frequency shifting) and complex demodulation to recover phase; a 3×3 coupler or M×N coupler where M≥2 or N≥3; a frequency sweeping optical signal to recover phase through the use of a Hilbert transform; a phase modulator receiving phase through time multiplexing of a changing phase shift; an arrangement of waveplates within a multiport interferometer; use of a spectrometer or optical filters and performing intensity or phase and amplitude measurement separately on different frequency bands; interference with a local oscillator; or any polarization-diverse (dual-polarization) version of the above. When the first ($\tau_1$) and second ($\tau_2$) delays are not equal ($\tau_1 \neq \tau_2$) it would be expected that the phase is not uniform throughout the optical spectrum, in which case the phase and amplitude measurement could be performed by using this fact, or performed separately on different frequency bands.

The phase measurement may comprise the use of a spectrometer or optical filters and performing intensity or phase and amplitude measurement separately on different frequency bands. Electronic mixing of the receiver signals with a reference signal may be used to shift higher analogue frequencies into lower frequency bands. The measurement of phase may be performed continuously over time; or in bursts. The measurement of phase may be performed synchronously with a measurement of amplitude.

The physical parameter may be selected from the group comprising: longitudinal strain; transverse strain; acoustic waves; seismic waves; vibration; motion; bending; torsion; temperature change; chemical composition change; or movement of scattering/reflecting particles in the sensing medium.

The physical parameter may be selected from the group comprising: longitudinal strain; transverse strain; acoustic waves; seismic waves; vibration; motion; bending; torsion; temperature change; optical delay change; chemical composition change; or movement of scattering/reflecting particles in the sensing medium.

The method of determining the locations of the said optical path length changes or physical parameter may comprise the step of using pulsed modulation and where the measured phase is proportional to the optical path length change over the delay time and sample time is approximately linearly mapped to position along the sensing medium. The method of determining the locations of the said optical path length changes or physical parameter may comprise the further step of a numerical deconvolution between the complex signal from the phase and amplitude receiver and the known or measured modulation. The method of determining the locations of the said optical path length changes or physical parameter may comprise the further step of a numerical cross-correlation between the complex signal from the phase and amplitude receiver and the known or measured modulation.

According to a fourth aspect of the invention, there is provided a method of modulating the intensity of a broadband source. The method may comprise the step of providing an optical amplifier which produces a continuous output of amplified spontaneous emission (ASE) when there is low input optical intensity. The method may comprise the further step of modulating the intensity of the ASE output of the optical amplifier using an intensity modulator. The method may comprise the further step of sending the modulated ASE to the input of the said optical amplifier or a second optical amplifier for amplification. The method may comprise the further step of using all or part of the amplified modulated light from the amplifier for use in a system. The method may comprise the further step of a modulation scheme where the modulation remains in a high intensity state for a duration, $\tau_P$, shorter than the time taken for light to travel from the output of the amplifier to its input, $\tau_O$, followed by a low intensity state for a duration longer than $\tau_O$.

According to a particular arrangement of the fourth aspect, there is provided a method of modulating the intensity of a broadband source comprising the steps of: providing an optical amplifier which produces a continuous output of amplified spontaneous emission (ASE) when there is low input optical intensity; modulating the intensity of the ASE output of the optical amplifier using an intensity modulator; sending the modulated ASE to the input of the said optical amplifier or a second optical amplifier for amplification; using all or part of the amplified modulated light from the amplifier for use in a system; a modulation scheme where the modulation remains in a high intensity state for a duration, $\tau_P$, shorter than the time taken for light to travel from the output of the amplifier to its input, $\tau_O$, followed by a low intensity state for a duration longer than $\tau_O$.

The bandwidth of the broadband optical source, may be between about 10 MHz to 100 MHz, 100 MHz to 1 GHz, 1 GHz to 10 GHz, 10 GHz to 100 GHz, 100 GHz to 1 THz, 1 THz to 10 THz, 10 THz to 100 THz. That is 10 MHz to 100 THz (i.e. $10 \times 10^6$ Hz to $100 \times 10^{12}$ Hz).

The modulation scheme may be pulsed modulation. The duration of the pulse may be shorter than $\tau_O$. The repetition period of the pulses may be longer than $\tau_O$.

The method of any one of the second to fourth aspects may be applied in the system of the first aspect. The method of the above second to fourth aspects may be applied to one or more uses in the group comprising: distributed acoustic sensing on fiber or waveguides; surface vibrometry; distributed acoustic LIDAR in air and atmosphere; wind velocity measurement (anemometry); distributed acoustic LIDAR in water; distributed acoustic LIDAR in pipeline fluids; Vertical seismic profiling in boreholes and wells; Marine streamers for seismic exploration; Land seismic sensors for seismic exploration; Permanent seismic monitoring arrays for repeat seismic imaging and inversion; Passive seismic monitoring, such as earthquake monitoring, micro-seismic monitoring and induced seismicity related to underground fluid injection or production; Monitoring of mine wall stability, such as microseismic monitoring and caving; Monitoring of dam stability, such as water dam induced seismicity and stiffness of tailings dams; Monitoring of conveyors; Monitoring of rotating machines such as compressors, fans, turbines and generators; Pipeline monitoring, such a leak detection and tampering; Perimeter and security monitoring/surveillance, such as intrusion detection; Infrastructure monitoring, such as strain and vibration control on bridges, tunnels, buildings and wind turbines; Vehicle structure monitoring, such as strain and vibration control in car, aeroplanes and ships; Flow measurement, such as metering flow in pipelines; Geotechnical surveys, such as surface wave inversion for of near surface shear wave velocity; Air movement profiling, such as atmospheric profiling, wind chamber profiling and around air vehicles; Water movement profiling, such as profiling oceanic currents, river flow and around marine vehicles; Medical devices, such as body strain sensors and blood flow measurements; Monitoring of telecommunication networks, such as disturbance and faults; Traffic and vehicle flow monitoring, such as roads, rail and boats; audio recording; and Fire monitoring, such as in tunnels and infrastructure.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 4 shows a schematic diagram showing the photonic components of a particular arrangement of the sensing system disclosed herein;

FIG. 5 shows a schematic diagram showing the photonic components of a further arrangement of the sensing system disclosed herein having a common path configuration;

FIG. 18 depicts an arrangement of the systems and FIGS. 18A to 18C depict further arrangements of the systems depicted above with methods of directing outgoing signals into a sensing medium without recombining in a common outward path and receiving backscatter signals from the sensing medium as disclosed herein.

DETAILED DESCRIPTION

Figure 1:
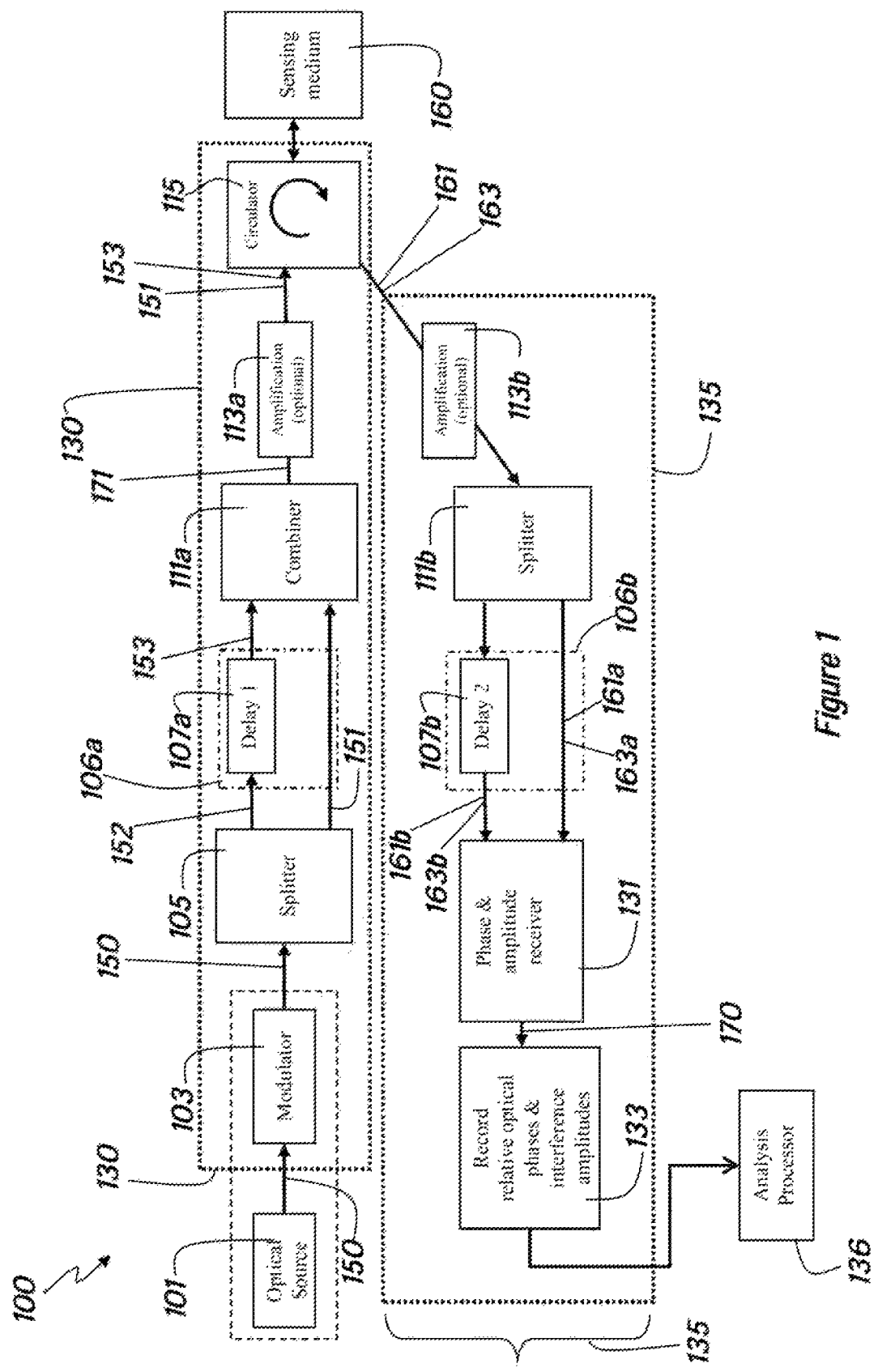
FIG. 1 shows a schematic block-diagram representation of the DAS systems and methods disclosed herein.

It should be noted in the following description that like or the same reference numerals in different embodiments denote the same or similar features.

Disclosed herein are systems and methods for quantitative distributed acoustic sensing (DAS) systems for quantitative distributed measurement of optical path length changes along a sensing medium such as, for example an optically transparent medium such as an optical fiber.

The DAS system disclosed herein comprises a broadband optical source and phase and amplitude measurement capable of accurately measuring phase. The broadband optical source may have a coherence time, $\tau_{coh}$ and, interchangeably, a coherence length, $l_{coh}$, defined as the optical path length corresponding to propagation in a medium for a time equal to the coherence time. There is no in-principle lower bound on the coherence length of the source when used in the systems and methods disclosed herein. Coherence time, $\tau_{coh}$, is calculated by dividing the coherence length, $l_{coh}$, by the velocity of light in a medium, and is approximately given by the relation $$\tau_{coh} \approx \frac{1}{\Delta v} \approx \frac{\lambda^2}{c\Delta\lambda},$$

where $\lambda$ is the central wavelength of the source, $\Delta v$ and $\Delta\lambda$ is the spectral linewidth of the source in units of frequency and wavelength respectively, and c is the speed of light in vacuum.

Multiple physical parameters may be sensed by the consequential optical path length changes they create in a medium coupled thereto. An example of phenomena which are capable of inducing optical path length changes in coupled media may include: longitudinal strain, transverse strain, acoustic waves, seismic waves, vibration, motion, bending, torsion, temperature, optical delay or chemical composition. Any other physical parameter having a mechanism which induces elongation and/or refractive index change and/or deformation along an optical path can also be sensed. Optical path length changes can also occur by the movement of scattering/reflecting particles in the sensing medium. The systems and methods disclosed herein utilise an intensity-modulated broadband light source in conjunction with delays and phase and amplitude measurement for accurate phase measurement on the distributed backscatter from a sensing medium such as, for example an optical fibre (referred to herein as a sensing fiber). Possible mechanisms for light returning from the sensing optical path back to the system include: Rayleigh backscatter; Mie backscatter; discrete reflections (intentional and non-intentional, such as faults or connector joins); Bragg grating reflections; scattering particles in solids such as dopants in crystals and glasses; scattering particles in liquids such as cells or slit in water; or scattering particles in gasses such as atmospheric aerosols in air.

Possible optical paths for the sensing medium used in conjunction with the presently disclosed systems and methods, or used for implementation of the optical delay means disclosed herein, include: single mode fiber; multi-mode fiber; multi core fiber; polarization maintaining fiber; photonic crystal; photonic bandgap fiber; fiber with liquid or gas filled core; planar waveguides any of which can be fabricated from any suitable material; or free space propagation in a backscattering medium (gas, liquid or solid) which may include air or water.

In the systems disclosed herein the output signal generated by the optical source is split into, for example, two portions which are then directed to IRDP where one portion of the output signal is time delayed (thus producing a delayed output signal) with respect to the second portion of the output signal which is not delayed (a direct output signal). The delayed output signal and the direct output signal are then directed to a sensing medium such that the delayed and direct output signals propagate through the sensing medium and thus subject changes in the sensing medium due to external disturbances. The delayed output signal and the direct output signal may optionally be combined onto a common optical path and and/or a common polarization prior to the sensing medium. Possible methods of separating light into multiple paths as would be appreciated by those skilled addressee for implementation of suitable IRDP with differing delays may include: optical couplers (2×2, 3×3, or M×N); beam splitter; polarizing beam splitter; switch (e.g. LCOS, holograms, MEMs or electro-optic); acousto-optic modulator; optical filter; partial reflector; or birefringence.

As they propagate through the sensing medium, the delayed and direct output signals are each scattered by the sensing medium in a distributed manned along the propagation direction of the output signals, and a portion of the scattered output signals propagates directly backward in the reverse propagation direction to the forward propagating signals. The backward propagating (or backscattered) light from the output signals is collected by the DAS system for analysis of any external disturbances causing optical path length changes in the sensing medium.

FIG. 1 shows a conceptual schematic block-diagram representation of a DAS system according to the present invention.

Output light 150 from optical source 101 is optionally modulated by modulator 103. In alternative arrangements, the optical source 101 is a pulsed optical source. In still further arrangements optical source 101 may have modulator 103 incorporated therewith. The source is preferably modulated within in the laser or before the separation, but alternatively can be modulated anywhere before entering the sensing medium (such as a sensing fiber) 160 i.e. the light in the forward-propagating path 130 is modulated at any point between the source 101 and sensing medium 160. Modulator 103 may be adapted to modulate any one or more of the intensity, frequency, phase or polarisation of the light in the forward-propagating path 130 of system 100 prior to sensing medium 160. Pulses or coded modulation are examples of possible modulation schemes which can be used. Possible alternative means for modulation as would be appreciated by the skilled addressee may include, for example: electro-optic modulators; acousto-optic modulators; optical switches; direct source modulation; and saturable absorbers. Possible modulation schemes may include: pulsing; pseudo-random coding; simplex Code; Golay Code; linear frequency chirp; or Barker Code.

If a modulator is placed after splitter 105 of system 100 than it can be adapted to act on either the delayed 151 or direct 153 outgoing portions without acting on the other outgoing portions, then the system 100 can function in a similar way to the case where the modulator is placed before the splitter 105.

If more than one modulators are used to act on the two outgoing portions 151 and 153 separately, then these modulators would preferably act on the portions before the delays and act in unison. If modulators act on the outgoing portions after the delays but before the combiner 111a, then the modulators would preferably use the same modulation pattern with a delay equal to the optical delay.

If a modulator is used after the combiner 111a and before the sensing medium 160, then the modulation would preferably repeat its modulation pattern after a time period equal to the optical delay.

Possible broadband optical sources may include: multimode lasers e.g. Fabry-Perot laser, single mode lasers e.g. DFB laser; spontaneous emission or amplified spontaneous emission (ASE), e.g. EDFA and SOA; superluminescent diodes (SLED); supercontinuum sources; mode locked lasers; amplitude modulated sources; frequency modulated sources; swept frequency sources; phase-shift keying lasers; phase modulated sources; natural light; fluorescence or phosphorescence; any optical filtered light source listed above as would be appreciated by the skill addressee; or any combination of the above sources. In particular arrangements the coherence length of the source is less than the spatial resolution of the system 100.

In the following discussion, the modulator is described as an intensity modulator for example purposes only. The skilled addressee, however, would readily appreciate that intensity modulation can readily be substituted with modulation of either the phase, polarisation or frequency of the light generated by the optical source 101.

In particular arrangements of system 100, the optical paths between each element thereof are provided by optical fiber. In alternate arrangements, the optical paths between elements may be free space. Light 150 from source 101 is next directed to optical splitter 105 where it is separated into at least 2 portions of output light 152 and 153 which are respectively directed to a first Intentional Relative Delay Path (IRDP) 106a comprising separated optical paths (for example, separate optical fibres). The first IRDP 106a comprises a first optical delay means 107a which, for example may be an optical fiber delay line of predetermined length in order to impart a known delay time, $\tau_1$, onto a first portion 152 of the split output signal and thereby to generate a delayed output signal 151. In further discussion, the split portion 153 of the optical output 150 which bypasses first optical delay means 107a is referred to as direct output signal 153. The delayed output signal 151 and direct output signal 153 are both then recombined in combiner 111a onto a common forward-propagating optical path 171 and then directed to the sensing medium 160, for example an optical fiber adapted for sensing one or more parameters capable of inducing optical path length changes on the sensing media, 160. In particular arrangements, the difference delay imparted on the separated signals 151 and 153 in the IRDP 106a is preferably (although not necessarily) longer than the round-trip time of light in the sensing medium 160.

Distributed backscatter induced by the forward propagating light in the sensing medium 160 and propagating backwards along the same optical path in sensing medium 160 is collected by system 100 and initially separated from the forward-propagating path 130 in system 100 into a backward-propagating path 135 by backscatter receiving means 115. Backscatter receiving means 115 may be an optical circulator or similar which a) receives forward-propagating light from forward propagating path 130 and directs it to sensing medium 160 and b) receives backward-propagating backscatter light from sensing medium 160 and directs it to backward-propagating path 135. The backscattered optical signals 161 and 163 received by the system 100 comprise a first backscattered return signal 161 arising from backscattering in the sensing medium 160 of the delayed output signal 151 and a second backscattered return signal 163 arising from backscattering in the sensing medium 160 of the direct output signal 153. The backscattered signals 161 and 163 each propagate on backward-propagating path 135 and are each split into at least two backscatter signal portions on separate optical paths by splitter 111b, and the split backscatter signal portions are directed to a second IRDP 106b. The second IRDP 106b comprises a second optical delay means 107b which, for example may be an optical fiber delay line of predetermined length in order to impart a known delay time, $\tau_2$, onto a first portion of each of the backscatter return signals 161 and 163.

The second optical delay means 107b is adapted to delay at least one portion of each the received backscatter signals 161 and 163 on the return path with respect to the other return optical paths by a predetermined delay time, $\tau_2$, thereby to produce a delayed backscatter signal portion of each of the backscatter signals 161 and 163 and at least one direct backscatter signal portion of each of the backscatter signals 161 and 163, wherein the delay of the first ($\tau_1$) and second ($\tau_2$) delay means satisfy the relation $|\tau_1-\tau_2|<a\ \tau_{coh}$, the coherence time of optical source 101, wherein multiplication factor, a, may be between 1 and about 100. In some instances, intentionally designing the system with $\tau_1 \neq \tau_2$ can be advantageous for phase and amplitude measurement, as described below. The return backscatter signals are then each directed to phase and amplitude receiver 131.

According to the optical pathways of system 100 described above, the phase and amplitude receiver 131 receives a plurality of signals including:

- a Direct+Direct signal comprising a backward propagating signal 161a arising from the direct output signal 151 having bypassed the second optical delay means 107b (Signal 1);
- a Delay+Direct signal comprising a backward propagating signal 163a arising from the delayed forward-propagating output signal 153 having bypassed the second optical delay means (Signal 2);
- a Direct+Delay signal comprising a backward propagating signal 161b arising from the direct output signal 151 having been transmitted through the second optical delay means 107b (Signal 3); and
- a Delay+Delay signal comprising a backward propagating signal 163b arising from the delayed output signal 153 having been transmitted through the second optical delay means (Signal 4).

Signal 2 163a and Signal 3 161b arrive at the receiver approximately at the same time to permit Signal 2 163a to interfere with Signal 3 161b thereby to generate an interference signal 170 at the output of receiver 131 adapted to provide a measure of the optical path differences between Signal 2 and Signal 3 which is indicative of a path length differences in the sensing medium 160 caused by an external disturbance.

The detected signals are recorded and stored in storage 133 and analysed by analysis processor 135 to calculate the effective path length changes in the sensing medium 160 caused by external disturbances.

System 100 further comprises optional amplifiers 113a and 113b respectively for 113a) optical amplification of the outbound forward propagating optical signals 151 and 153 prior to launching into the sensing medium (e.g. sensing fibre) 160; and 113b) optical amplification of the received backscatter signals 161 and 163.

In this way, broadband light which travels coherently throughout the system 100 and within the sensing medium 160, can travel nearly equal optical path lengths between the source and the phase and amplitude receiver (the so called "white-light" interference condition), regardless of the optical frequency and regardless of the location along the sensing fiber where back-reflection has occurred. This condition produces an electronically measurable interference signal at the phase and amplitude receiver 131 between the broadband distributed backscatter which returns from the sensing medium 160 at different times. The relative phase of the delayed and non-delayed backscatter signals 163a and 161b (arising from the direct output signal and the delayed output signal respectively), as measured at a phase and amplitude receiver 131, contains the primary information required to accurately determine the changes in the optical path length that occur in the sensing medium within the delay period induced by the first (forward-propagating) IRDP and first optical delay means 107a. The amplitude of the detected signal, as measured at phase and amplitude receiver 131, can be used to estimate the quality of the phase information, as discussed in the signal model derivation below, and be used to improve the spatial resolution and sensitivity of the distributed sensing by the use of coding schemes.

Possible phase and amplitude measurement methods may include: frequency shifting (e.g. acousto-optic frequency shifting) the Direct+Delay and/or Delay+Direct signals and complex demodulation to recover phase; 3×3 coupler or M×N coupler where M≥2 or N≥3; frequency sweeping and Hilbert transform for recovery of phase; phase modulator receiving phase through time multiplexing of a changing phase shift; arrangement of waveplates within a multiport interferometer; use of a spectrometer (e.g. grating) or optical filters and detecting intensity or performing phase and amplitude measurement in different frequency bands; Interference with a local oscillator; or any polarization-diverse (dual-polarization) version of the above as would be appreciated by the skilled addressee. When the first ($\tau 1$) and second ($\tau_2$) delays are not equal ($\tau_1 \neq \tau_2$) it would be expected that the phase is not uniform throughout the optical spectrum, in which case the phase and amplitude measurement could be performed by using this fact, or performed separately on different frequency bands. This could have advantages, including: improving manufacture simplicity and costs and compensating for dispersion in the sensing medium. Performing phase and amplitude measurement in different frequency bands could also enable distributed sensing on multiple sensing media by using a frequency demultiplexer to direct outgoing signals to different sensing media and receiving the returning backscatter signals with a frequency multiplexer.

Possible arrangements of first and second optical delay means 107a and 107b as would be appreciated by the skilled addressee may include such means of delaying light as: optical fiber delay line; optical beam delay line (e.g. free space); will optical cavities; recirculating loop; or electromagnetically induced transparency.

Figure 8:
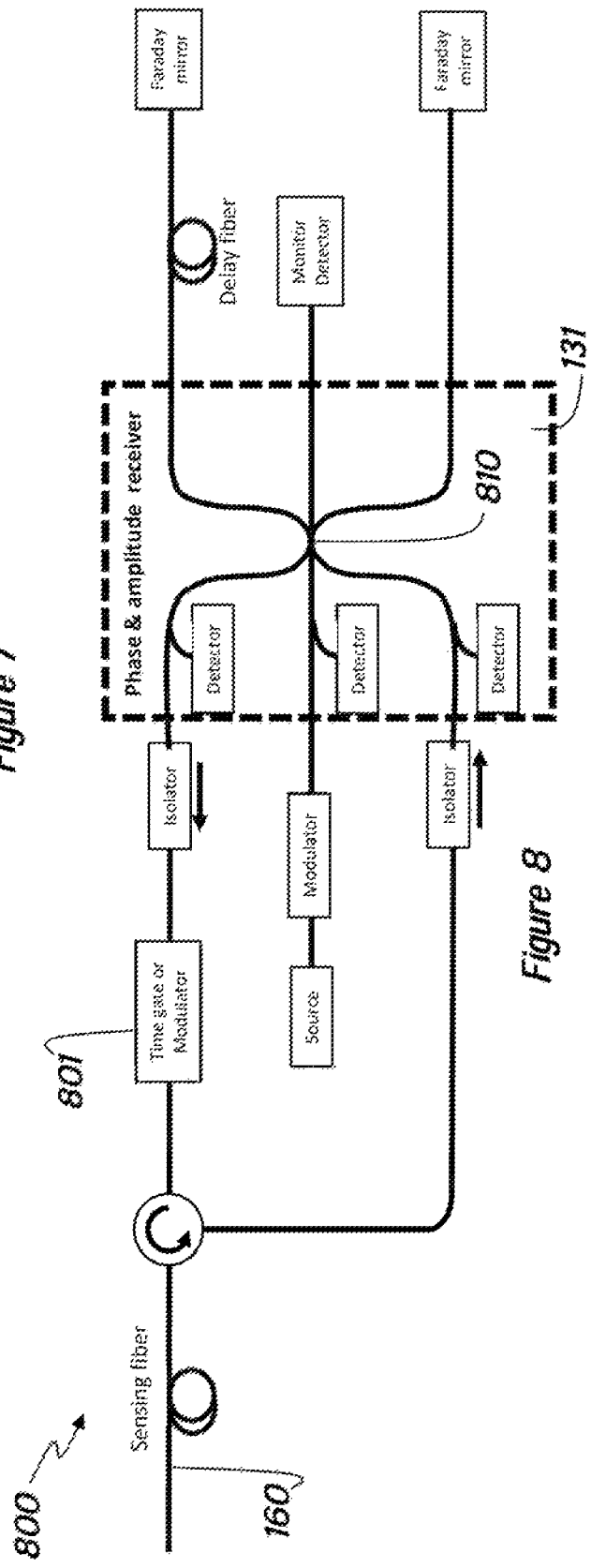
FIG. 8 shows the photonic components of a further arrangement of the sensing system disclosed herein in the common-path embodiment, using all output ports of a 3×3 coupler as phase and amplitude receiver.
Figure 13:
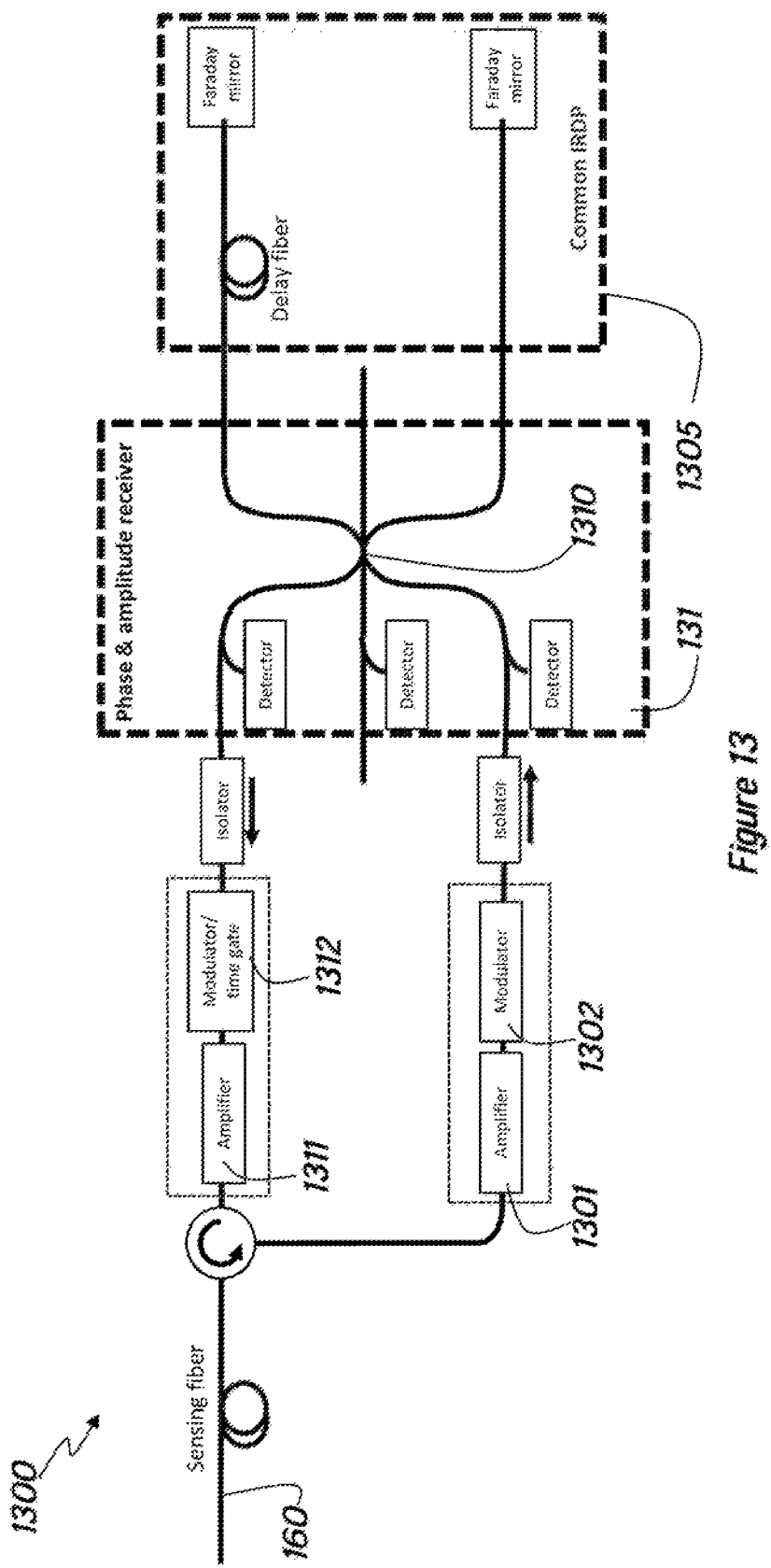
FIG. 13 shows the photonic components of a further arrangement of the sensing system disclosed herein where amplified spontaneous emission from one optical amplifier is used as the source.
Figure 15:
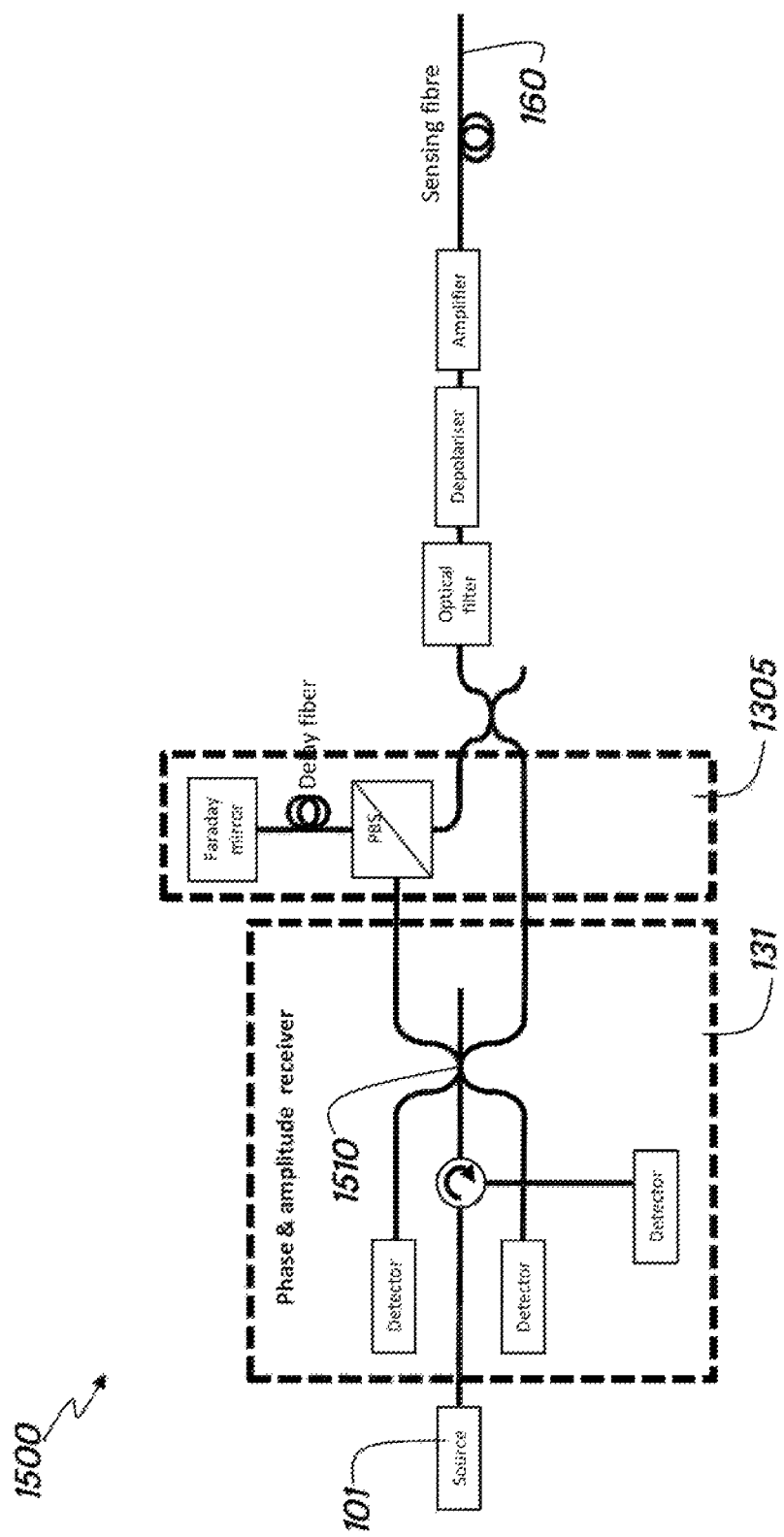
FIG. 15 shows the photonic components of a further arrangement of the sensing system disclosed herein in the common-path embodiment, using all output ports of a 3×3 coupler as phase and amplitude receiver.

Preferably, the splitter and the phase and amplitude receiver could comprise of common devices, as shown in FIG. 8, FIG. 13 or FIG. 15.

Figure 14:
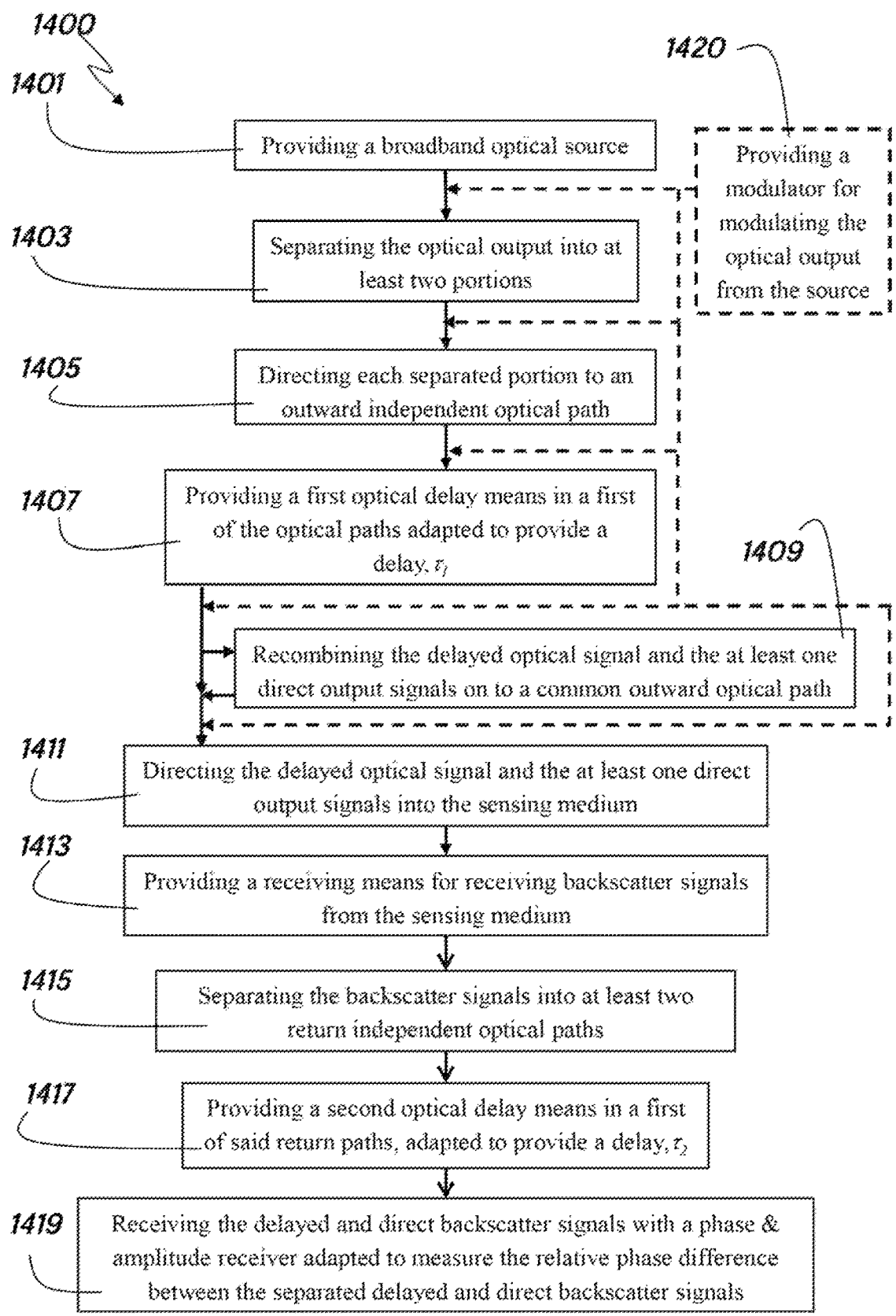
FIG. 14 depicts a method of sensing distributed backscatter signals as disclosed herein.

Referring now to FIG. 14, there is depicted a method of sensing distributed backscatter signals including a method 1400 of quantitatively sensing optical path length changes along a sensing medium in a distributed manner. Method 1400 comprises the step of providing 1401 a broadband optical source for generating an optical output, the optical source having a coherence time, $\tau_{coh}$. Method 1400 further comprises the step of separating 1403 the optical output into at least two portions and directing 1405 each separated portion to an outward independent optical path. Separation may be performed by spatial separation or separation into polarization components, but is not limited to these. An independent polarization is considered an independent optical path. Method 1400 further comprises providing 1407 a first optical delay means in a first of said optical paths. The first optical delay means is adapted to delay at least one portion of the optical output on the first forward optical path with respect to the other independent forward optical paths by a predetermined delay time, $\tau_1$ thereby to produce a delayed output signal and at least one direct output signal. Method 1400 optionally comprises providing an optical re-combiner for recombining 1409 the delayed optical signal and at least one direct output signals on to a common forward optical path and directing 1411 the output signals into the sensing medium, whether recombined or not. Method 1400 further comprises providing 1420 a modulator for modulating the optical output generated by the optical source. Modulating step 1420 may be performed anywhere between steps 1401 and 1411. The modulator may be adapted to modulate any one or more of the intensity, frequency, phase or polarisation of the light in the forward-propagating path 130 prior to the sensing medium 160.

Method 1400 further comprises providing 1413 a receiving means for receiving backscatter signals from the sensing medium. Method 1400 further comprises separating 1415 the backscatter signals into at least two independent return paths. Separation may be performed by spatial separation or separation into polarization components, but is not limited to these. An independent polarization is considered an independent optical path. Method 1400 further comprises providing 1417 a second optical delay means in a first of the return paths. The second optical delay means is adapted to delay at least one portion of the received backscatter signals on the first return path with respect to the other return optical paths by a predetermined delay time, $\tau_2$ thereby to produce a delayed backscatter signal and at least one direct backscatter signal.

The delay of the first and second delay means satisfy the relation $|\tau_1 - \tau_2| < a\, \tau_{coh}$ wherein multiplication factor, a, may be between 1 and about 100. The first and second delay means may be a common device or a common optical path. Method 1400 further comprises receiving 1419 the delayed and direct backscatter signals with a phase and amplitude receiver adapted to measure the relative phase difference between the separated delayed and direct backscatter signals. An analysis processor 135 can be used on the measured amplitudes and phases to perform the measurement of optical path length changes in the sensing medium in a distributed manner.

Figure 2:
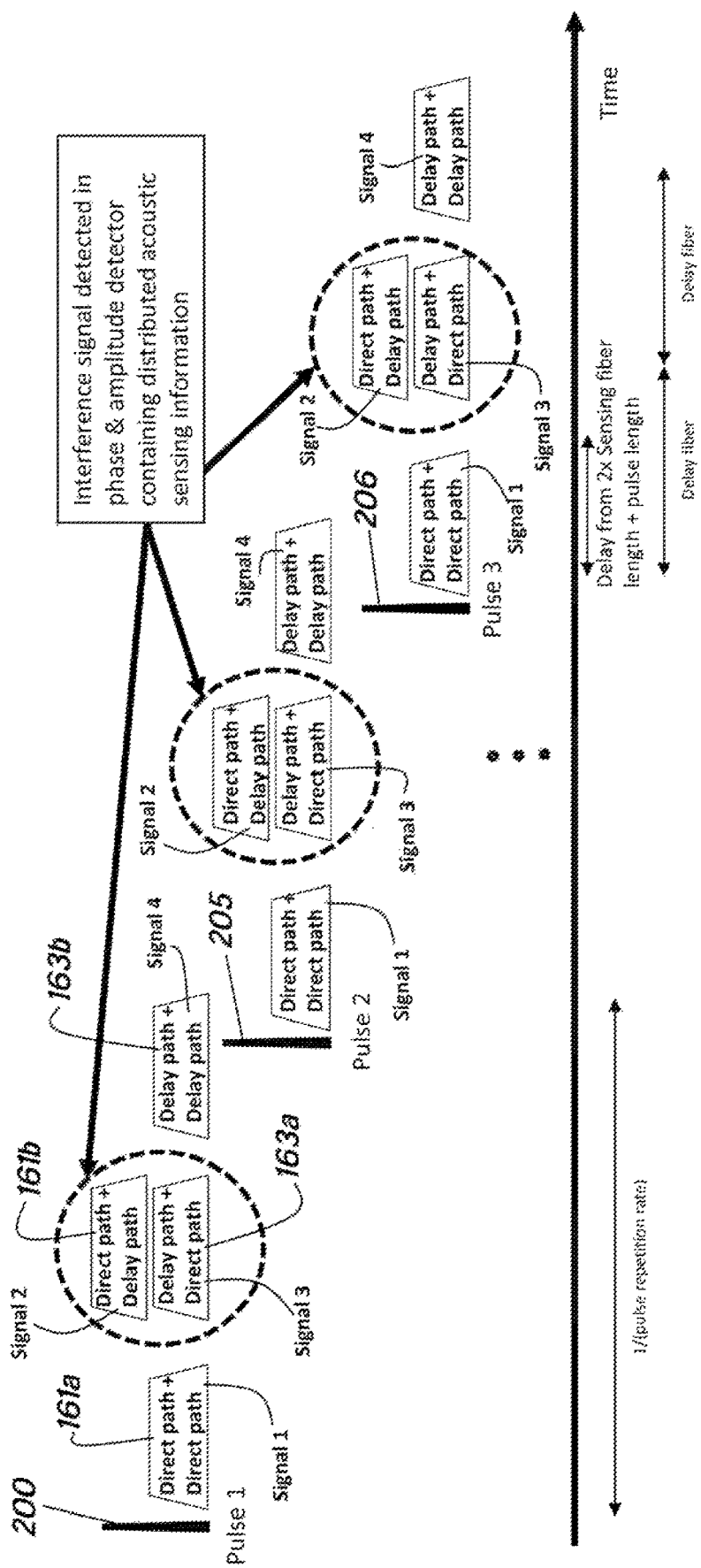
FIG. 2 shows a schematic representation of the arrival times of distributed backscatter optical signals from the sensing medium in the presently disclosed systems and methods.

Returning now to FIG. 2, there is shown a timeline depiction of the arrival times of distributed backscatter signals onto the phase and amplitude receiver 131 from the sensing medium in the presently disclosed systems and methods such as system 100 with a modulated optical source 101. Where the modulated source is an intensity modulated source, the depth of the intensity modulation is preferably greater than 50% up to 100% (for example the output from a pulsed optical source). For clarity, the arrival times in FIG. 2 are described with reference to a pulsed optical source. Soon after the pulse 200 is generated, light which has traveled through the direct paths (i.e. bypassing the first optical delay means 107a in the forward propagating direction as well as the second optical delay means 107b in the backward propagating direction) before and after the sensing medium (optical fibre) 160 arrives at the phase and amplitude receiver 131. It is spread through time due to the distributed backscatter. If the delays are longer than the round-trip time of light in the sensing medium 160, the light which arrives at receiver 131 has traveled first through the direct path then through the delayed path (i.e. Signal 3 161b) will arrive at the receiver without overlap with signal 1 161a and signal 4 163b. Signal 3 161b will interfere coherently with the light which has first traveled through the delayed path then the direct path i.e. Signal 2 163a, which arrives nearly synchronously with Signal 3 161b. The relative phase of Signal 3 161b and Signal 2 163a is used for the present method of sensing. The light which travels through both delayed paths (i.e. Signal 4 163b) then follows. The process is repeated for subsequent pulses 205 and 206.

Figure 3:
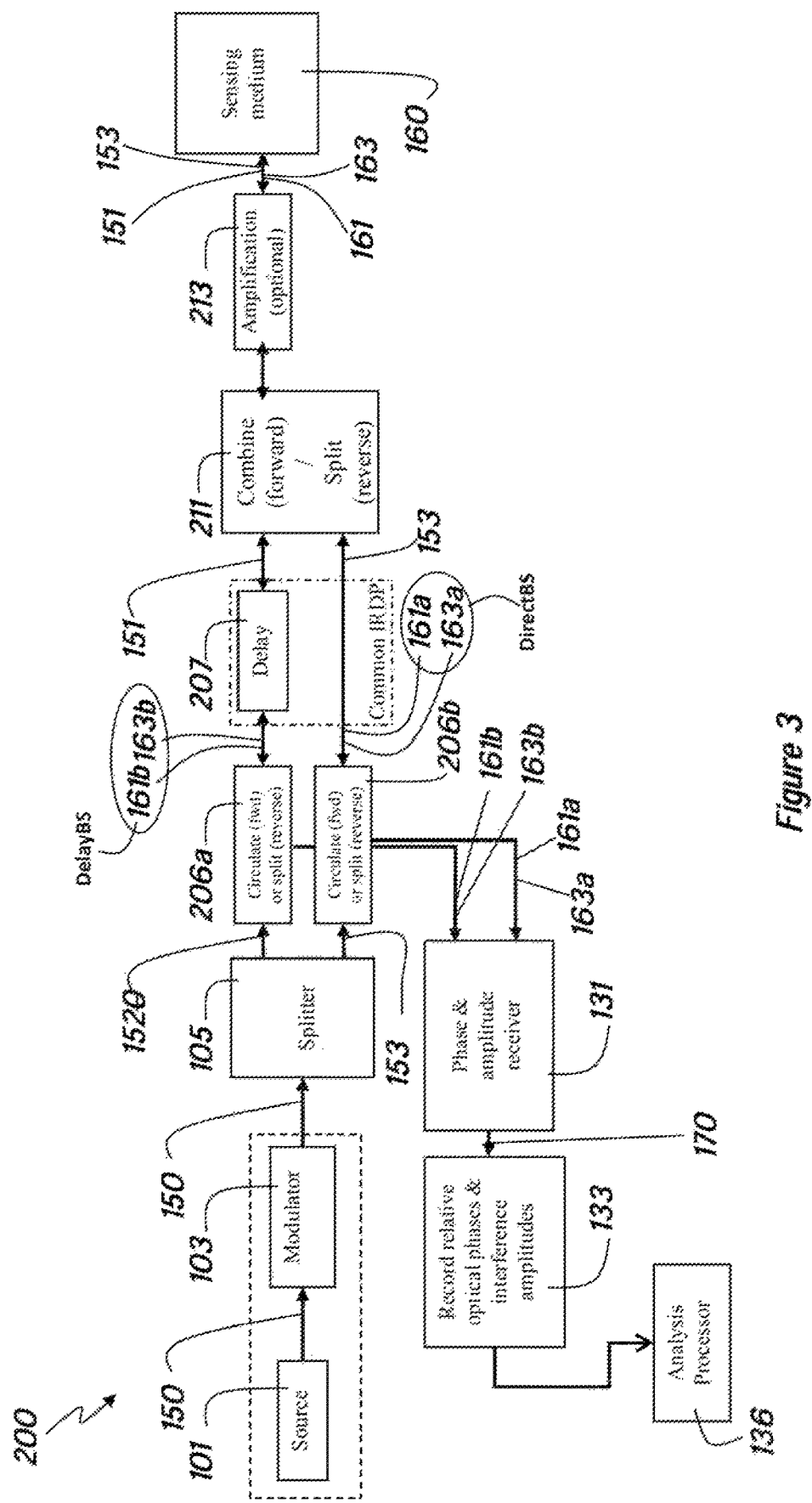
FIG. 3 shows a schematic block-diagram representation of the DAS systems and methods disclosed herein in a common path configuration.

FIG. 3 shows a conceptual schematic block-diagram representation of a DAS system 200 according to a further arrangement of the present invention in a common-path configuration. In FIG. 3 common reference numerals are used to designate like elements as compared with FIG. 1.

A common-path embodiment, as illustrated in FIG. 3, is where the delays before and after the sensing medium 160 are achieved using a common optical path (for example a waveguide such as an optical fiber though the polarization, direction or timing may be different. Alternatively, a common path embodiment can have completely identical optical paths for the delays before and after the sensing medium 160. Such embodiments greatly simplify the manufacturing costs and complexity of the system, since the change in delays between two or more separate IRDP or optical delay means with respect to such parameters as temperature, pressure or ageing, do not need to be accounted or compensated for in the system (either physically, electronically or in signal processing) to ensure that the difference in delay remains less than the coherence time of the source in accordance with the system that methods disclosed herein. In the common path embodiments (where the delays are static), the phase measured at the phase and amplitude receiver would be close to zero when the sensing fiber is also static. Any change in optical path length within the sensing medium 160 would result in proportional non-zero phase. Without a common path embodiment, and where long lengths of different optical fiber are used for delays before and after the sensing medium, care should be taken to ensure that the fibers optical path lengths are manufactured to within the coherence length of the source (which can be as short as $\tau_{coh}$~100 micrometers), and will remain so over the operating temperature range of the system (for example 10° C. to 50° C.).

In the common-path arrangement of FIG. 3 the forward-propagating IRDP with optical delay means 107a and the backward-propagating IRDP with optical delay means 107b are replaced with a single IRDP which is common to both forward- and backward propagating paths with a single common optical delay means 207. System 200 additionally comprises a plurality of optical circulators or couplers 206a and 206b to:

(a) receive light from optical source 101 and direct it through the IRDP in the forward propagating direction where the two split portions of the output signal are combined in hybrid combiner/splitter 211 before being launched into the sensing medium 160 to generate backscatter signals; and (b) receive the backward propagating backscattered light from the sensing medium 160 (e.g. optical fiber sensing medium) where each received backscatter signal is split into two portions by combiner/splitter 211, and each of the split backscatter signals passing through common-path IRDP in the backward-propagating direction and directed by circulators 206a and 206b to phase and amplitude receiver 131. Again the detected signals are recorded and stored in storage 133 and analysed by analysis processor 135 to calculate the distributed path length changes in the sensing medium 160 caused by external disturbances.

System 200 further comprises optional amplifier 213 for optical application of the forward propagating optical output signals and the backward propagating received optical backscatter signals from medium 160.

FIGS. 4 and 5 show schematic layouts of dual path (see for example, FIG. 1) and common-path (see for example, FIG. 3) optical systems 400 and 500 in common system nomenclature in further arrangements of systems 100 and 200 respectively.

Figure 6:
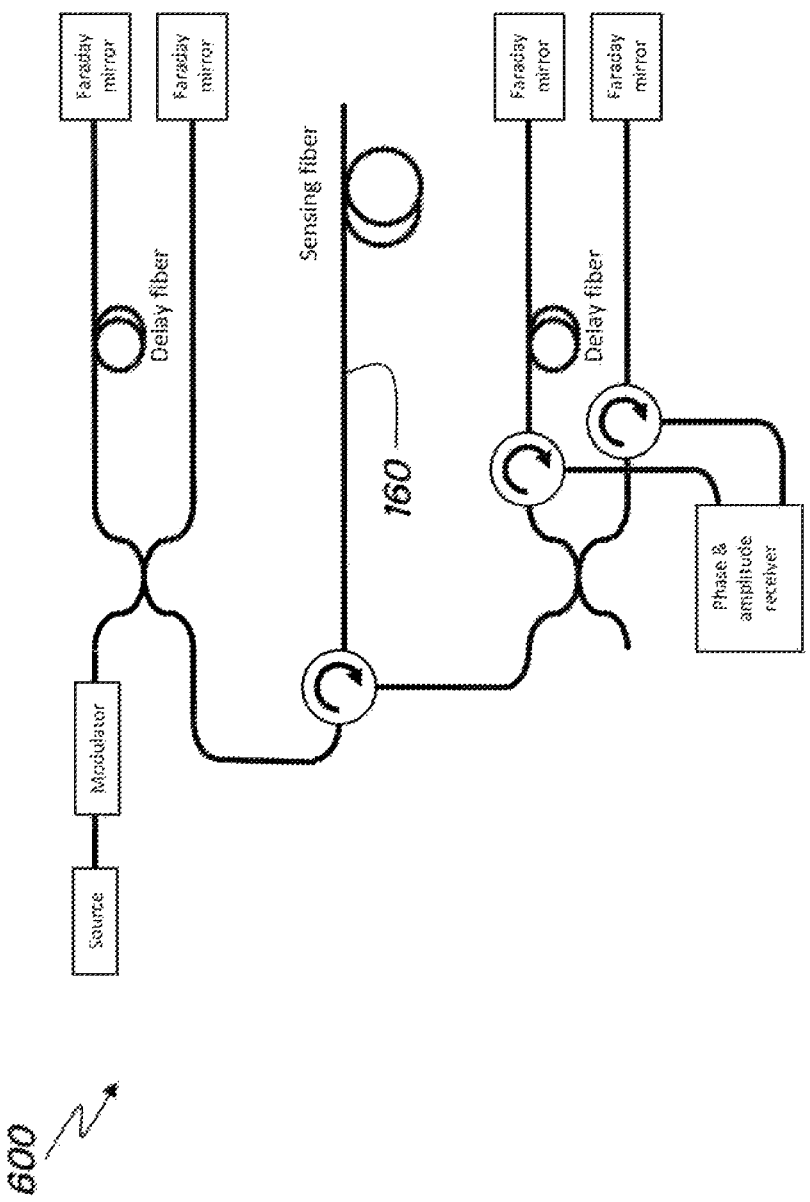
FIG. 6 shows a schematic diagram showing the photonic components of a particular arrangement of the sensing system disclosed herein.
Figure 7:
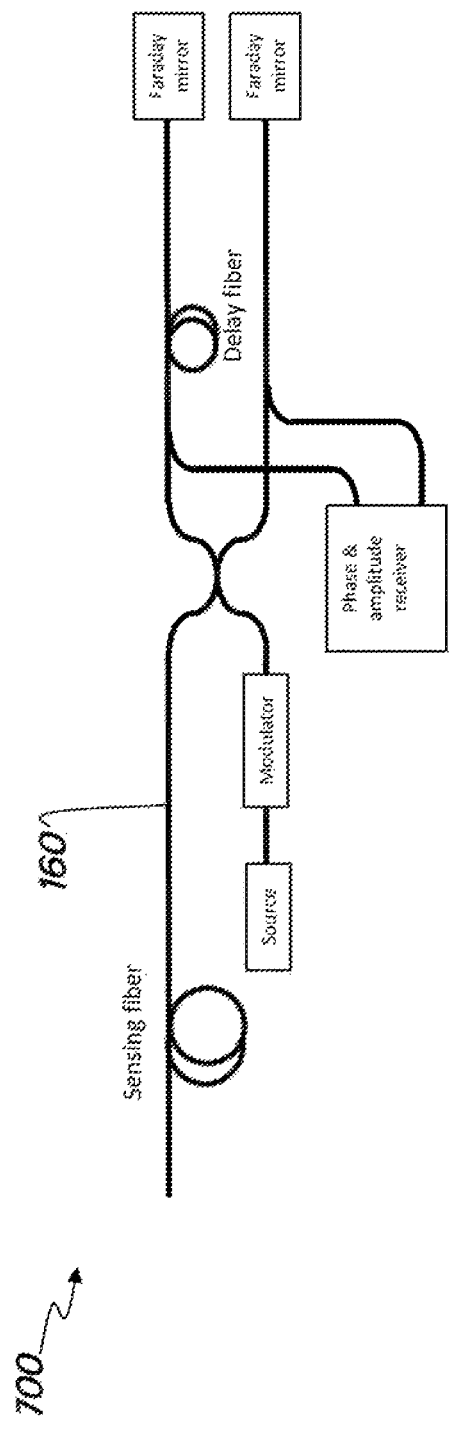
FIG. 7 shows a schematic diagram showing the photonic components of a further arrangement of the sensing system disclosed herein having a common path configuration.

FIGS. 6 and 7 show schematic layouts of dual path (see for example, FIG. 1) and common-path (see for example, FIG. 3) optical systems 600 and 700 in common system nomenclature in further arrangements of systems 100 and 200 respectively. FIGS. 6 and 7 are configured utilising polarisation modifying Faraday mirrors in the interferometer arms of each arrangement. A Faraday mirror returns light with its polarisation rotated by 90° with respect to the polarisation of the input light. As would be appreciated by the person skilled in the art, the Faraday mirrors thereby serve to compensate for any uncontrolled and/or random change in the polarization state of light which has traveled through long lengths of optical fibre. In this way, long lengths of standard single mode optical fibre, which is less costly than polarization maintaining fibre, can be used for delaying optical signals while ensuring a fixed relationship between the input and output states of polarization.

FIG. 8 shows the photonic components of a further arrangement 800 of the sensing system disclosed herein in a common-path embodiment, using all output ports of a 3×3 coupler 810 as a phase and amplitude receiver as would be appreciated by the person skilled in the art. If we represent the three detected output signals from an ideal 3×3 coupler by $I_1$, $I_2$ and $I_3$, then the real part of the complex interference signal can be determined by the linear combination ($I_1+I_2-2*I_3$) and the imaginary part of the complex signal can be determined by the linear combination ($I_1-I_2$). A time gate or modulator 801 may be used to prevent return signal from the sensing fibre from being directed back to the sensing fibre with the outgoing signals.

Figure 9:
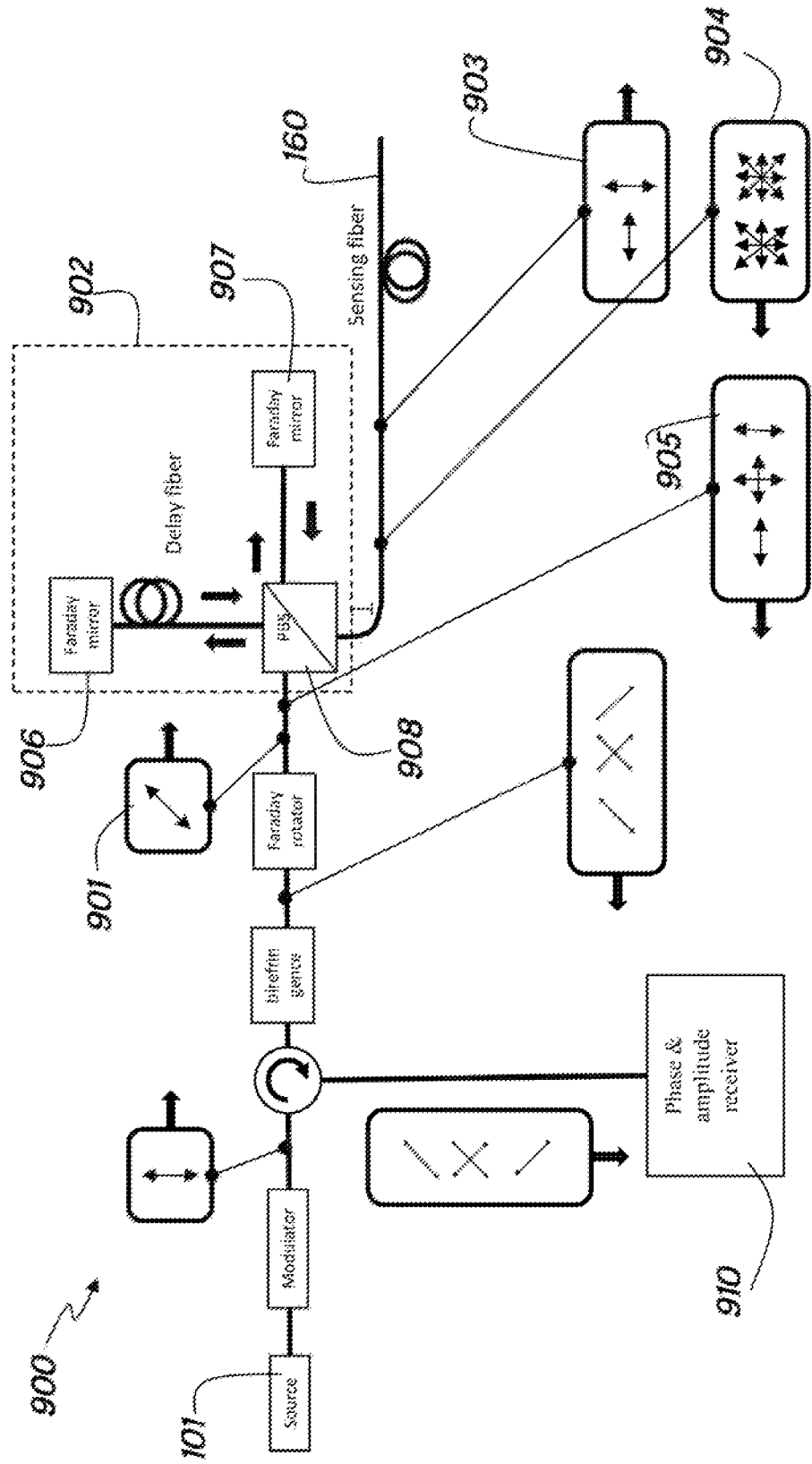
FIG. 9 shows the photonic components of a of a further arrangement of the sensing system disclosed herein in the common-path embodiment with polarization beam splitter.

FIG. 9 shows the photonic components of a further arrangement of the sensing system disclosed herein in the common-path embodiment with polarization beam splitter 908. The polarization states of the light travelling within different parts of the system are illustrated by the vectors and the action of various components on those polarization states can be understood by a person skilled in the art. The purpose of this arrangement is to utilize polarization to ensure that the majority of the light 901 entering the Intentional Relative Delay Path (IRDP) 902 is directed towards the sensing fibre by the action of the polarization beam splitter and Faraday mirrors. The forward-propagating light 903 entering into the sensing medium 160, in this arrangement, an optical fibre. Furthermore, this arrangement also ensures that the majority of backscattered light 904, which is backscattered by the sensing fibre and which enters the IRDP 902 is directed towards the phase and amplitude receiver 910 by same action of the polarization beam splitter and Faraday mirrors 906 and 907. The light which is directed towards to the phase and amplitude receiver and its associated polarization states are labelled 905. In this arrangement, the two orthogonal polarizations in a single fibre act as independent optical paths.

Figure 10:
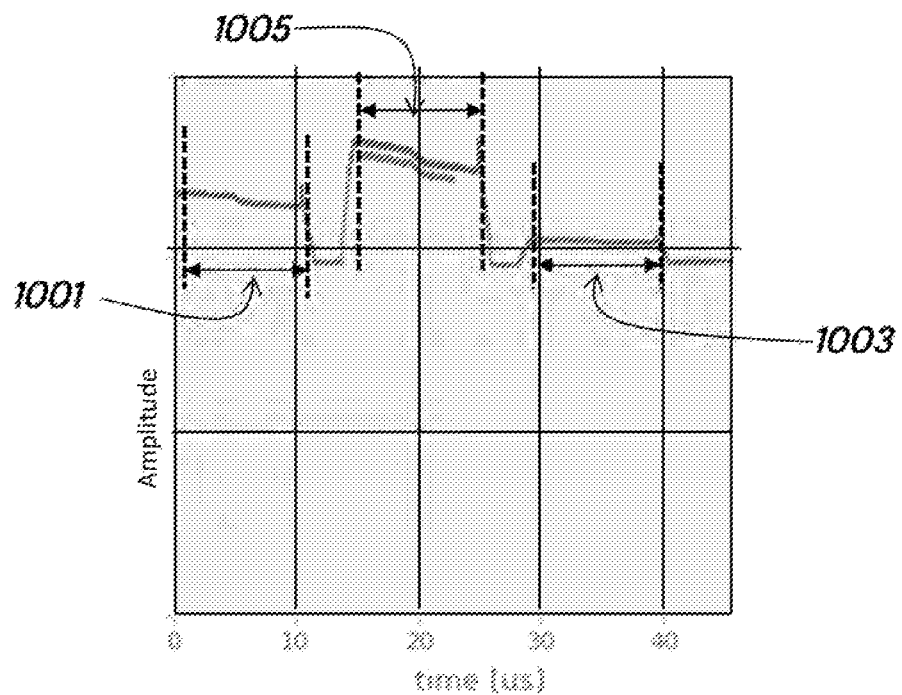
FIG. 10 shows an example detected amplitude trace for a pulsed DAS system according to the systems and methods disclosed herein.
Figure 11:
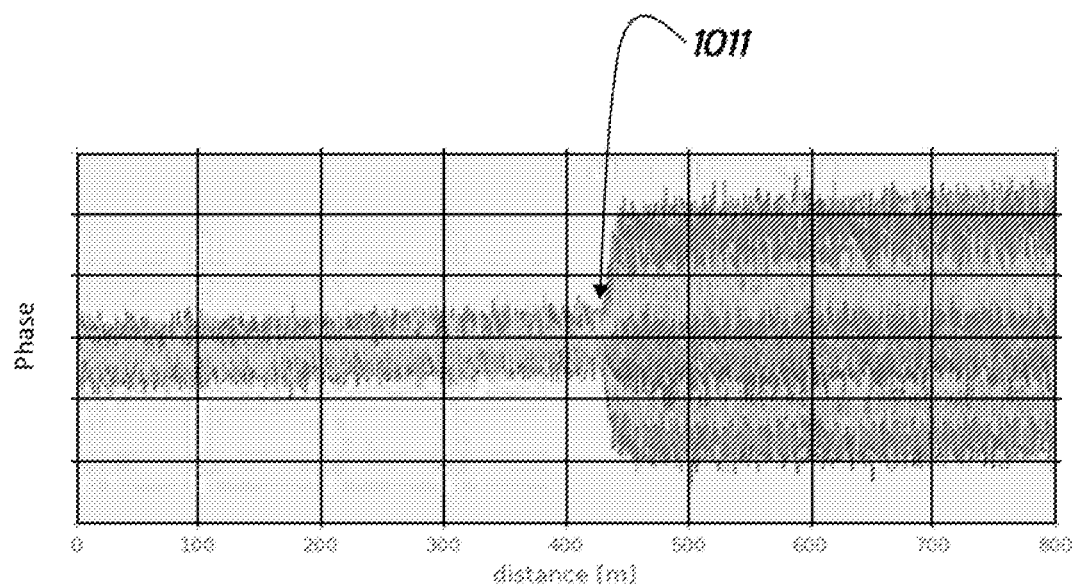
FIG. 11 shows an example of the measured phase vs. position along the sensing fiber with an vibrating fibre stretcher at 430 m for testing purposes according to the systems and methods disclosed herein.
Figure 12:
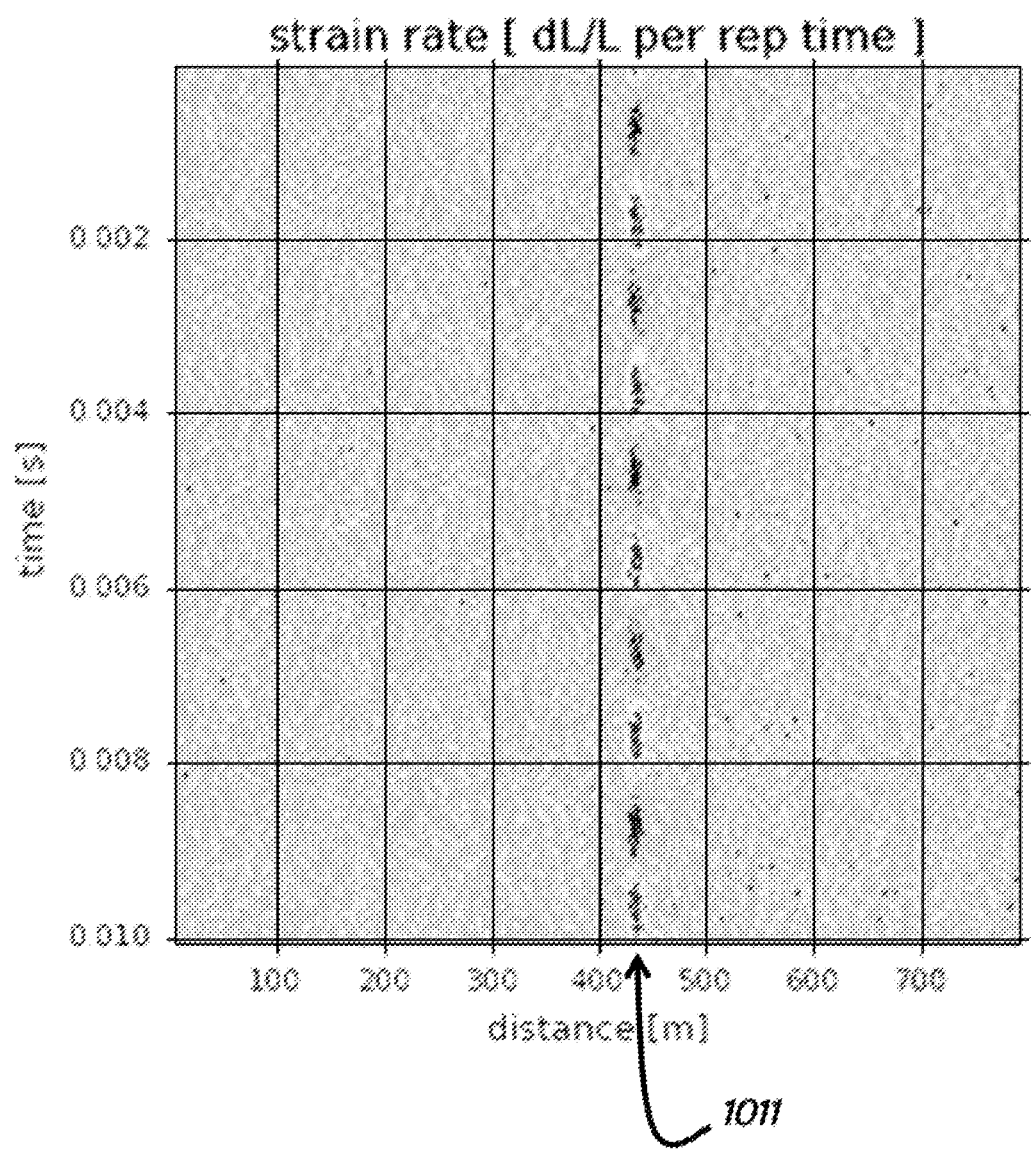
FIG. 12 shows an example of the computed strain rate vs. position along the sensing fiber and vs. time with a vibrating fibre stretcher at 430 m for testing purposes according to the systems and methods disclosed herein.

Experimental validation of the present invention is provided in FIGS. 10 to 12. FIG. 10 shows the amplitude of the signal from a phase and amplitude receiver vs. time for a pulsed scheme detecting distributed backscatter radiation from a sensing medium comprising a telecommunications-grade optical fibre of approximately 800 m in length. The first portion 1001 of the detected signal corresponds to detected backscatter signals 161*a* arising from the direct output signal 151 having bypassed the second optical delay means 107*b* (Signal 1). The last portion 1003 of the detected signal corresponds to detected backscatter signals 163*b* arising from the delayed output signal 153 having been transmitted through the second optical delay means (Signal 4). The central portion 1005 of the detected signal corresponds to detected backscatter signal 163*a* arising from the delayed forward-propagating output signal 153 having bypassed the second optical delay means (Signal 2) and also from backscatter signals 161*b* the direct output signal 151 having been transmitted through the second optical delay means 107*b* (Signal 3) and thus is the portion of the detected signal in which interference between Signal 2 and Signal 3 occurs at the receiver and which is used for analysis of the optical path length changes in the sensing medium.

In this example, the pulse length of pulsed light output generated by the optical source is 100 ns, the pulse repetition rate of the source output is 20 kHz and the delay is from the IRDP used in the experimental system is 15 microseconds. The data in the present example was acquired using the common path setup illustrated in FIG. 15. The coherence length of the source in the present example is less than 0.05 mm corresponding to a bandwidth of approximately 4 THz. A fiber stretcher with single frequency tone is placed in the sensing fiber to provide a vibration signal which modifies the path length of the sensing fibre at that location and is located approximately 430 m from the input end of the sensing fiber.

FIG. 11 is a graph of the detected phase of the backscattered signal from a phase and amplitude receiver vs. position along the sensing fiber. FIG. 12 shows the computed strain rate vs. position and vs. time. The strain, ε, is computed from the phase gradient, $$\frac{\Delta\phi}{\Delta x},$$

using the formula $$\varepsilon = \frac{\Delta\phi}{\Delta x} \frac{\lambda}{4\pi n \gamma},$$

where λ is the central wavelength of the source, n is the refractive index of the fibre and γ=0.78 is an elasto-optic coefficient which quantifies the change in the refractive index of an optical fiber caused by variation in the length of the fibre length in response to mechanical strain. The position 1011 of the external disturbance to the sensing fibre (the fiber stretcher) can readily be observed in the detected signal at a distance of 430 m along the fibre.

FIG. 11 also exhibits nonlinearity in the sensing fiber that is manifested in the detected signal by an upward slope in the detected phase with respect to distance indicating the regular deterministic nature of the effects of nonlinearity in the sensing medium in the present systems and methods. This effect has been attributed to the Kerr non-linearity, in which the refractive index of the fibre is momentarily modified by the intensity of the light in the fibre. If so desired, the effects of the nonlinearity in the detected signal can readily be corrected for either by equalizing the power in the delayed and direct paths, or in the analysis by removing a constant offset, as would be appreciated by the skilled addressee. Experimental results using the arrangement in FIG. 5 and with peak optical powers exceeding 1 W have not shown any negative impacts associated with the non-linear effects of modulation instability nor stimulated Brillouin scattering, which are known have detrimental effects on coherent optical fibre sensing systems at much lower peak powers (peak optical power).

The system 1300 in FIG. 13 has a similar arrangement to system 800 in FIG. 8, utilising a 3×3 coupler 1310 and can operate in 2 distinct modes. In the first mode of operation, the broadband amplified spontaneous emission (ASE) from the amplifier 1301 functions as the optical source for the system. This ASE can be modulated by an intensity modulator 1302 prior to entering the IRDP 1305 and then is directed towards the sensing fibre. A second modulator/time gate 1312 serves as a time gate to allow this modulated ASE into the sensing fibre but no other unwanted light (e.g. backscattered light from the sensing fibre would be prevented from re-circulating in the system). In the second mode of operation, the modulator 1302 is not required and the continuous ASE from amplifier 1301 enters the IRDP and is then modulated at the intensity modulator 1312 prior to being directed towards the sensing fibre. The intensity modulator 1312 can also serve to prevent unwanted light from entering the sensing fibre in this mode of operation. In either mode of operation, the modulators 1302 and 1312 may be incorporated directly in the amplifiers 1301 and 1311 (respectively), through direct modulation of the amplifier gain.

FIG. 15 shows a schematic layout of a common-path (cf. FIG. 3) optical system 1500 in common system nomenclature in further arrangements of systems 100, 200 and 300 respectively. System 1500, in a similar manner to system 800 of FIG. 8, uses all three optical signal outputs on the returning paths of a 3×3 coupler 1510 as a phase and amplitude receiver as would be appreciated by the person skilled in the art.

Figure 16:
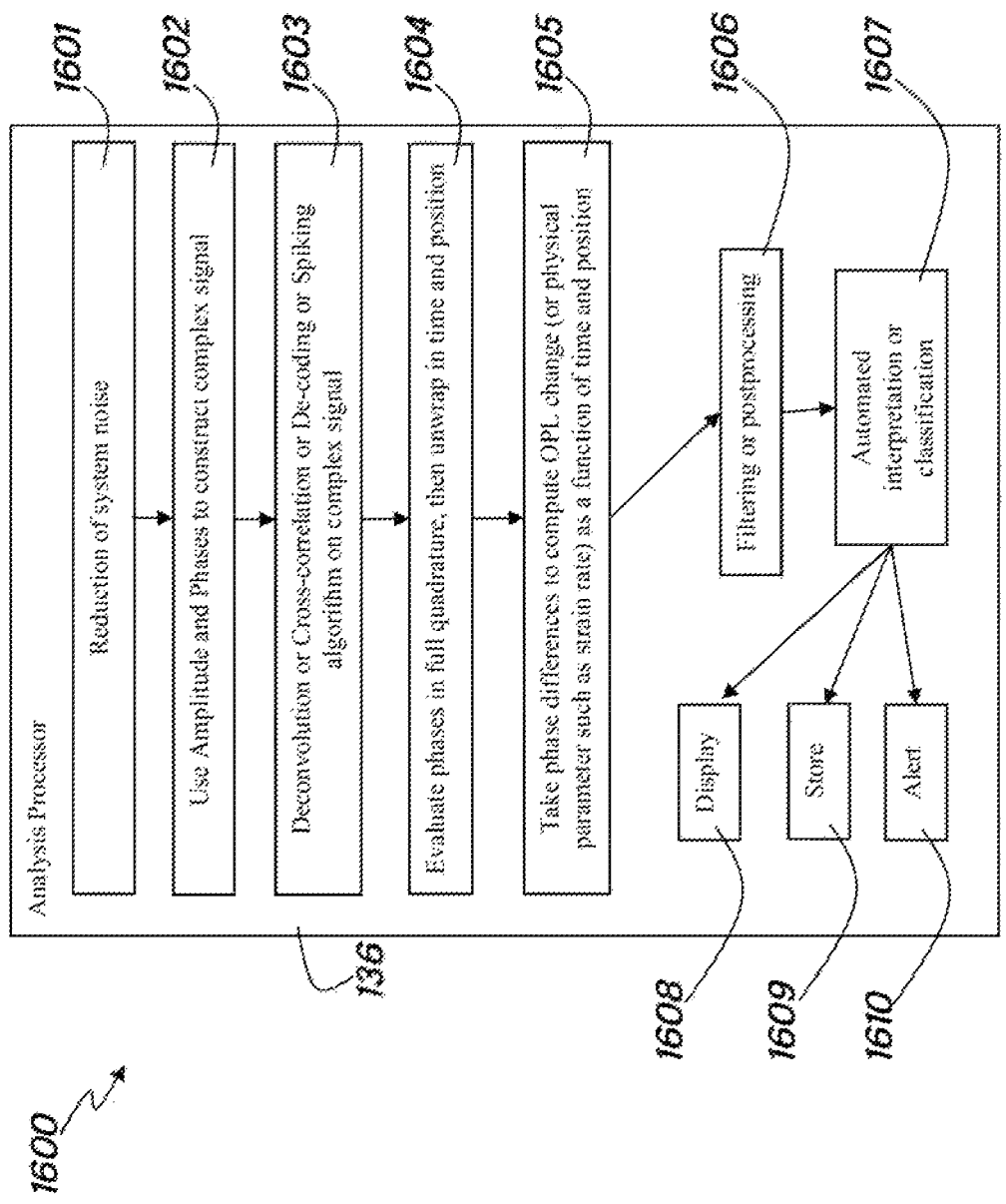
FIG. 16 depicts a method of processing and analysis of amplitudes and phases as disclosed herein.

In FIG. 16, there is depicted a method 1600 of analysis and processing as would be implemented in the analysis processor 135 of FIG. 1). With reference to system e of FIG. 1, method 1600 comprises the steps of: reducing system noise 1601 through means such as filtering of electronic signals; Constructing a complex signal 1602 using the amplitudes and phases measured by phase and amplitude receiver 131; applying an process/algorithm 1603 of deconvolution, cross-correlation, de-coding, spiking, chromatic dispersion compensation, polarization dispersion compensation or nonlinearity compensation on the complex signal to compensate for the known or measured modulation applied to the output signals 151 and 153 or the propagation properties of the medium these signals traversed; computing the phase of the resulting complex signal 1604; taking phase differences or phase gradients 1605 to compute the optical path length change or a physical parameter of the sensing medium 160 such as, for example, strain (where sensing medium 160 comprises an optical fibre) as a function of time and position; filtering or post-processing 1606 as required for a given application; applying known methods of automated interpretation or classification 1607 as required for a given application; displaying 1608 and/or storing 1609 the resulting sensing data; and generating an alert 1610 to a user based on predefined criteria and as required for a given application.

Figure 17:
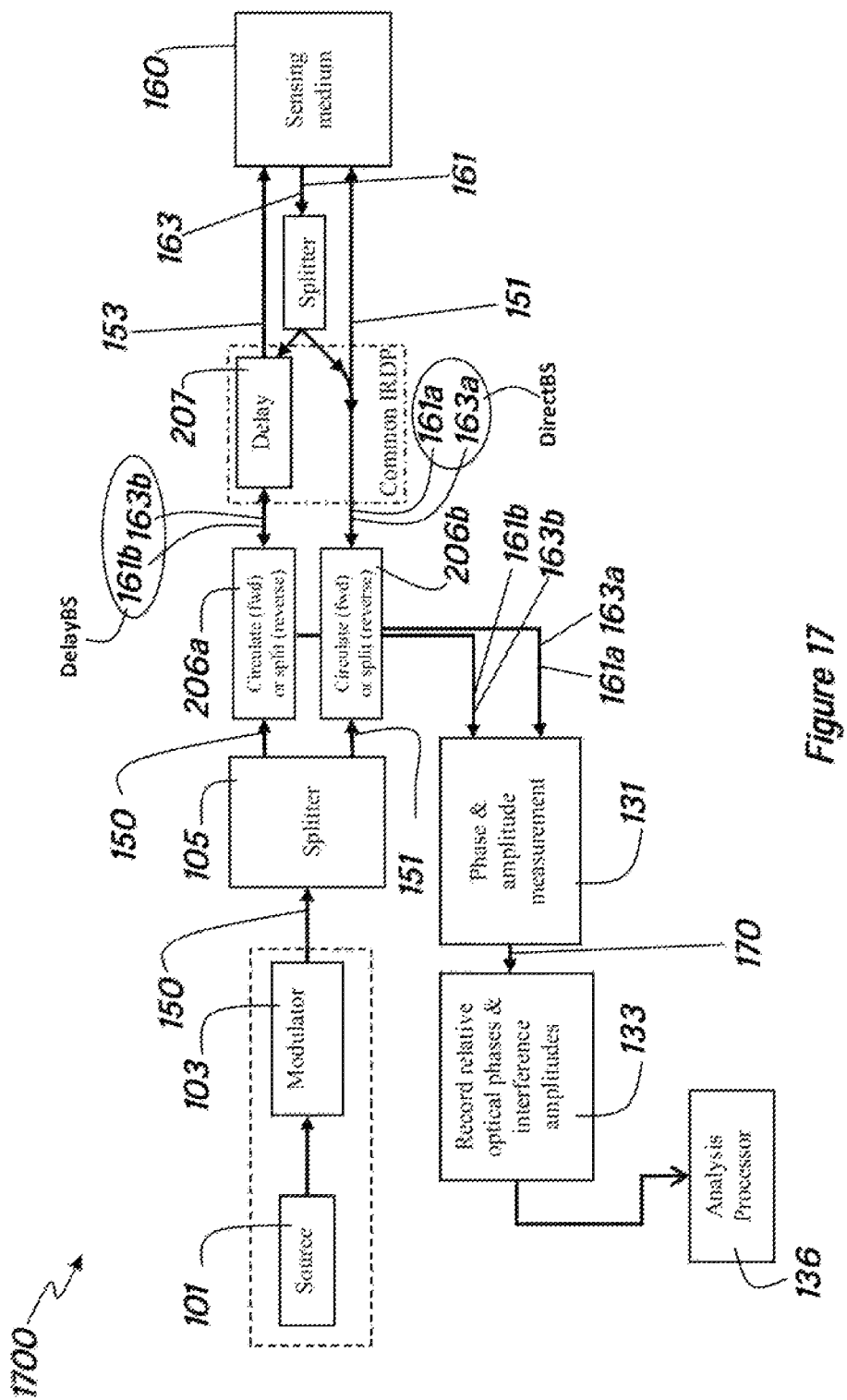
FIG. 17 shows a schematic block-diagram representation of the DAS systems and methods disclosed herein in a common path configuration with 2 independent optical paths to the sensing medium.

FIG. 17 shows a conceptual schematic block-diagram representation of a DAS system 1700 according to a further arrangement of the present invention in a common-path configuration. In FIG. 17, common reference numerals are used to designate like elements as compared with FIG. 1 and FIG. 3. System 1700 shows the delayed output signal 151 and the direct output signal 153 being directed to the sensing medium 160 without an intermediate step of recombining the output signals onto a common forward optical path.

FIG. 18 shows a conceptual schematic block-diagram representation 1800 of output signals directed to the sensing medium without a step of recombining the output signals onto a common forward optical path. In FIG. 18 common reference numerals are used to designate like elements as compared with FIG. 17. FIGS. 18A to 18C respectively show three example arrangements 1801, 1802 and 1803 of photonic implementations of system 1800. Arrangement 1802 shows an example where the 2 output and 2 return paths from the sensing medium may not be separated spatially, but rather are separated and independent due to orthogonal polarizations, and not necessarily linear polarization states.

Figure 19:
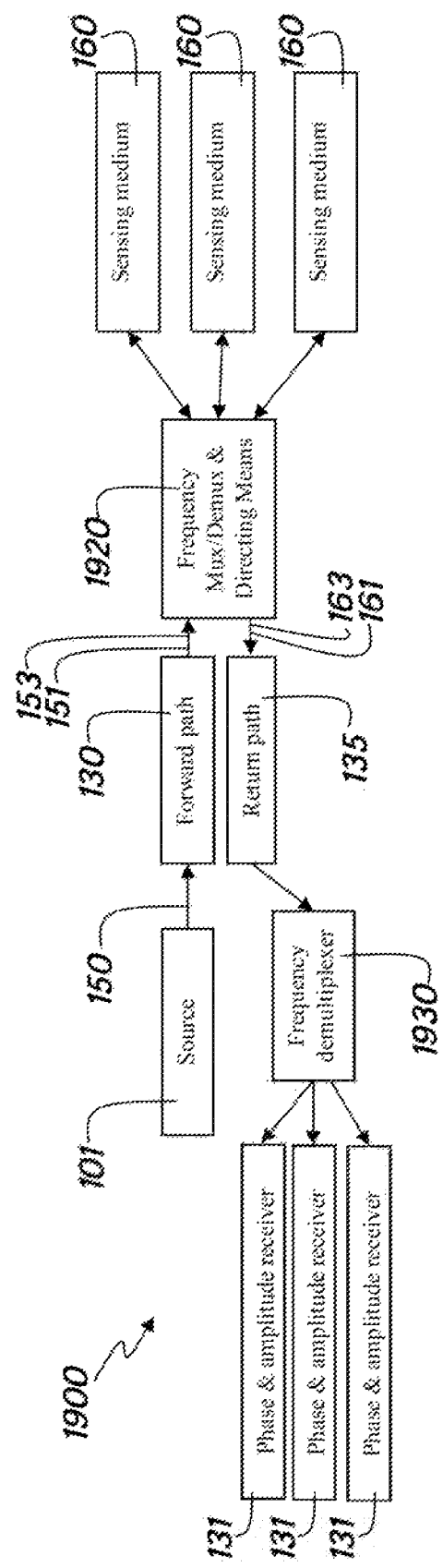
FIG. 19 depicts a further arrangement of the systems depicted above with the addition of frequency selective multiplexing/demultiplexing and frequency directing components for detecting path length changes on multiple sensing mediums.

FIG. 19 depicts a further embodiment 1900 of the systems disclosed above, where the forward propagating path 130 comprises splitter and delay means (not shown) similar to that depicted in FIG. 1. Before being directed to sensing medium 160, however, frequency demultiplexer/multiplexer 1920 is provided to split the forward propagating (direct and delayed) optical signals into a plurality of frequency bands, and to direct each pair of forward propagating signals, in each frequency band to a selected one of a plurality of sensing mediums 160.

Frequency multiplexer/demultiplexer (Mux/Demux) 1920 is further adapted to receive backward propagating backscatter signals from each sensing medium 160 and direct the pairs of signals from each sensing medium 160 onto return path 135 similar to return path as shown in FIG. 1. System 1900 further comprises frequency demultiplexer 1930 to direct selected frequency bands from the backward-propagating signals onto a corresponding plurality of phase and amplitude receivers 131 adapted to measure differences in amplitude phase of the received optical signals in the selected frequency bands to determine optical path length changes along each selected mediums 160 in a distributed manner to infer physical changes in the selected mediums 160. As shown in FIG. 3, the forward and return paths 130 and 135 can share a common IRDP. In some embodiments, it may be advantageous to direct the backward-propagating signals in multiple frequencies bands to one phase and amplitude receiver 131, in which case the number of sensing mediums is more than the number of phase and amplitude receivers. In other embodiments, it may be advantageous to separate the backward-propagating signals from one sensing medium into multiple frequencies bands and direct the light in each frequency band to separate phase and amplitude receivers, in which case the number of sensing mediums is less than the number of phase and amplitude receivers.

Derivation of the Signal Model

Using the coupled mode equations for coupling between forward and back propagating modes in an optical medium specifically, an optical fiber, Froggatt and Moore (M. Froggatt and J. Moore, "*High-spatial-resolution distributed strain measurement in optical fiber with Rayleigh scatter*", Appl. Opt., vol. 37, no. 10, pp. 1735-1740, 1998.) have derived the following expression:

$$R(\beta) = \frac{\beta E_0(\beta)}{2i} \int_{-\infty}^{\infty} \frac{\varepsilon(z) - \varepsilon_{co}}{\varepsilon_{co}} e^{i2\beta z} dz \quad (1)$$

where
- $R(\beta)$ is the complex amplitude of the Rayleigh (non-frequency shifted) backscattered wave;
- $\varepsilon_{co}$ is the permittivity of the fibre core;
- $\varepsilon(z) - \varepsilon_{co}$ is the random variation of the permittivity of the fibre core;
- We assume $(z) - \varepsilon_{co} = 0$ outside the sensing fibre;
- $\beta$ is the propagation constant in the waveguide; and
- $E_0(\beta)$ is the complex amplitude of the exciting field at $z=0$.

This result shows that the complex amplitude of the backscattered field from the random permittivity fluctuation is the spatial Fourier transform of the permittivity fluctuation evaluated at twice the special frequency of the exciting field.

The following substitutions can then be made:

$$z = v_p \tau / 2,$$

where $\tau$ is the 2-way (phase velocity) travel time; and
$v_p = c/n_{eff}$ is the phase velocity;
$S(\omega) = R(\beta(\omega))$ is the signal in the frequency domain;
$E(\omega) = E_0(\beta(\omega))$ is the launch field in the frequency domain; and
$\beta = \omega / v_p$ is the propagation constant, to give:

$$S(\omega) = E(\omega)(-i\omega) \int_{-\infty}^{\infty} \frac{1}{4} \frac{\varepsilon\left(\frac{v_p \tau}{2}\right) - \varepsilon_{co}}{\varepsilon_{co}} e^{i\omega\tau} d\tau$$

Now we define:

$$y(\tau) = \frac{1}{4} \frac{\varepsilon\left(\frac{v_p \tau}{2}\right) - \varepsilon_{co}}{\varepsilon_{co}}$$

And using Fourier transforms formulations:

$$Y(\omega) = \mathcal{F}[y(\tau)]$$

to get:

$$S(\omega) = E(\omega)(-i\omega)Y(\omega).$$

Or, equivalently, the signal model can be rewritten in concise notation as:

$$S(\omega) = E(\omega) G(\omega)$$

$$s(\tau) = e(\tau) * g(\tau) \quad (2)$$

where
- * denotes convolution
- $G(\omega) = (-i\omega) Y(\omega)$ has been substituted
- $g(\tau)$ is interpreted as the impulse response function of the fibre in the time domain.
- $s(\tau)$ is the signal in the time domain
- $e(\tau)$ is the launch field in the time domain
- $g(\tau)$, $s(\tau)$ and $e(\tau)$ are related to $G(\omega)$, $S(\omega)$ and $E(\omega)$ by Fourier transforms.

Using the identity:

$$\mathcal{F}^{-1}[(-i\omega)Y(\omega)] = \frac{dy(\tau)}{d\tau}$$

we find:

$$g(\tau) = \frac{dy(\tau)}{d\tau}$$
$$= \frac{1}{4\varepsilon_{co}} \frac{d\varepsilon\left(\frac{v_p \tau}{2}\right)}{d\tau}$$
$$= \frac{v_p}{8\varepsilon_{co}} \frac{d\varepsilon(z)}{dz}$$

To determine the interference between 2 backscattered fields on the same fibre, we consider the geometry depicted in FIG. 1. In this geometry, there are two backscattered signal fields at the phase and amplitude receiver:

$$s(t) = e(t) * g(t) + e(t-T) * \tilde{g}(t)$$

$$s(t - \tilde{T}) = e(t - \tilde{T}) * g(t) + e(t - T - \tilde{T}) * \tilde{g}(t)$$

where $\tilde{g}(t)$ is the impulse response function of the fibre after a delay T. It represents the perturbation applied to $g(t)$ which is to be sensed.

Consider the interference term:

$$s(t) s^*(t - \tilde{T}) =$$
$$(e(t) * g(t))(e(t - \tilde{T}) * g(t))^* + (e(t) * g(t))(e(t - T - \tilde{T}) * \tilde{g}(t))^* +$$
$$(e(t - \tilde{T}) * \tilde{g}(t))(e(t - \tilde{T}) * q(t))^* + (e(t - T) * \tilde{g}(t))(e(t - T - \tilde{T}) * \tilde{g}(t))^*$$

Through time, frequency or polarization multiplexing, terms 1, 2 and 4 can be forced to equal zero, leaving the only the 3rd term:

$$s(t) s^*(t-\tilde{T}) = (e(t-T) * \tilde{g}(t))(e(t-\tilde{T}) * g(t))^*$$

Substituting:
$e_T(t) = e(t-T)$;
$\tilde{g}(t) = g(t + \rho(t))$, i.e. a very small deformation has occurred to $g(t)$ after a time T, equivalent to a position dependent shift/dilation;
$\Delta T = T - \tilde{T}$;
we get $$s(t) s^*(t - \tilde{T}) = (e_T(t) * g(t + \rho(t)))(e_T(t + \Delta T) * g(t))^* =$$

$$\int_{t'} e_T(t - t') g(t' + \rho(t')) dt' \int_{t''} e_T^*(t - t'' - \Delta T) g^*(t'') dt'' =$$

$$\int_{t''} \int_{t'} e_T(t - t') e_T^*(t - t'' - \Delta T) g(t' + \rho(t')) g^*(t'') dt' dt''$$

Then, substitute $t^\# = t' + \rho(t')$ to get:

$$= \int_{t''} \int_{t'} e_T(t - t^\# + \rho(t')) e_T^*(t - t'' - \Delta T) g(t^\#) g^*(t'') dt' dt''$$

-continued $$dt^{\#} = dt'^{\left(1+\frac{d\rho(t')}{dt'}\right)}$$
$$\cong dt' \text{ since } \frac{d\rho(t')}{dt'} \ll 1,$$

and $$\rho(t') \cong \rho(t^{\#})$$

Therefore:

$$= \int_{t''}\int_{t^{\#}} e_T(t-t^{\#}+\rho(t^{\#}))e_T^*(t-t''-\Delta T)g(t^{\#})g^*(t'')dt^{\#}dt''$$

Substituting $t'=t^{\#}$:

$$= \int_{t''}\int_{t'} e_T(t-t'+\rho(t'))e_T^*(t-t''-\Delta T)g(t')g^*(t'')dt'dt''$$

When sampled at time $t_j$ with sampling time $\Delta t$:

$$d(t_j) = \frac{1}{\Delta t} \int_{t_j}^{t_j+\Delta t} s(t)s^*(t-T)dt$$

$$d(t_j) = \int_{t''}\int_{t'} g(t')g^*(t'')\frac{1}{\Delta t}\int_{t_j}^{t_j+\Delta t} e_T(t-t'+\rho(t'))e_T^*(t-t''-\Delta T)dt\,dt'dt''$$

Assuming the following Stochastic model for the impulse response function:

$$\frac{1}{\Delta T}\int_{t_j}^{t_j+\Delta t} e_T(t-t'+\rho(t'))e_T^*(t-t''-\Delta T)dt =$$

$$\frac{1}{\Delta t}\int_{t_j}^{t_j+\Delta t} e_T(t-t''-\Delta T+t''-t'+\Delta T+\rho(t'))e_T^*(t-t''-\Delta T)dt \approx$$

$$I(t_j-t''-\Delta T)\delta(t''-t')e^{i\omega_0(t''-t'+\Delta T+\rho(t'))}$$

Where the detected intensity is given by:

$$I(t_j-t''-\Delta T) = \frac{1}{\Delta t}\int_{t_j}^{t_j+\Delta t} e_T(t-t''-\Delta T)e_T^*(t-t''-\Delta T)\,dt;$$

we get:

$$d(t_j) \approx \int_{t''}\int_{t'} g(t')g^*(t'')I(t_j-t''-\Delta T)\delta(t''-t')e^{i\omega_0(t''-t'+\Delta T+\rho(t'))}dt'dt''$$

or:

$$d(t_j) \approx \int_{t'} g(t')g^*(t')I(t_j-t'-\Delta T)e^{i\omega_0(\Delta T+\rho(t'))}dt'$$

Or equivalently, in convolution notation:

$$d(t_j) \approx I(t_j-\Delta T)*(e^{i\omega_0(\Delta T+\rho(t_j))}|g(t_j)|^2)$$

Thus, to determine the change in optical path length, $\rho(t_j)$, a deconvolution between the intensity modulation, $I(t_j-\Delta T)$, and the recorded data, $d(t_j)$, is applied $$[I(t_j-\Delta T)*]^{-1}d(t_j) \approx e^{i\omega_0(\Delta T+\rho(t_j))}|g(t_j)|^2.$$

And therefore:

$$\rho(t_j) \approx \frac{\text{phase}[I(t_j-\Delta T)^{*-1}d(t_j)]}{\omega_0} - \Delta T.$$

Or alternatively:

$$\rho(t_j) \approx \frac{\text{phase}[\mathcal{F}^{-1}[\mathcal{F}[d(t_j)]/\mathcal{F}[I(t_j-\Delta T)]]]}{\omega_0} - \Delta T.$$

Cross-correlation can form an approximate deconvolution, particularly if $|\mathcal{F}|[I(t_j)]|^2 \approx$ constant, and the cross-correlation is written as:

$$\rho(t_j) \approx \frac{\text{phase}[\mathcal{F}^{-1}[\mathcal{F}[d(t_j)]\mathcal{F}^*[I(t_j-\Delta T)]]]}{\omega_0} - \Delta T.$$

If $\Delta T$ is larger than the coherence length, then:

$$d(t_j) \approx \int_{t'}\int_{t'} g(t')g^*(t'')I(t_j-t''-\Delta T)\delta(t''-t'+\Delta T)e^{i\omega_0(t''-t'+\Delta T+\rho(t'))}dt'dt'';$$

$$d(t_j) \approx \int_{t'} g(t')g^*(t'-\Delta T)I(t_j-t'\Delta T)e^{i\omega_0(\rho(t'))}dt'.$$

Or equivalently, in convolution notation:

$$d(t_j) \approx I(t_j-\Delta T)*(e^{i\omega_0\rho(t_j)}g(t_j)g^*(t_j-\Delta T)) = I(t_j-\Delta T)*(e^{i\omega_0\rho(t_j)}e^{i\psi(t_j)}|g(t_j)g^*(t_j-\Delta T)|)$$

If $g^*=\hat{g}$ represents a different sensing medium (e.g. optical fibre), then $$d(t_j) \approx \int_{t'}\int_{t'} g(t')\hat{g}(t'')I(t_j-t''-\Delta T)\delta(t''-t'+\Delta T)e^{i\omega_0(t''-t'+\Delta T+\rho(t'))}dt'dt'';$$

$$d(t_j) \approx \int_{t'} g(t')\hat{g}(t'-\Delta T)I(t_j-t'\Delta T)e^{i\omega_0(\rho(t'))}dt'.$$

Or equivalently, in convolution notation:

$$d(t_j) \approx I(t_j-\Delta T)*(e^{i\omega_0\rho(t_j)}g(t_j)\hat{g}(t_j-\Delta T)) = I(t_j-\Delta T)*(e^{i\omega_0\rho(t_j)}e^{i\psi(t_j)}|g(t_j)\hat{g}(t_j-\Delta T)|)$$

Analysis of the Detected Signal

The derivation above shows that the change in optical path length, $\rho(t)$, induced in the sensing medium, e.g. an optical fiber, is given by the expression:

$$\rho(t) \approx \frac{\text{phase}[\mathcal{F}^{-1}[\mathcal{F}[d(t)]/\mathcal{F}[I(t-\Delta T)]]]}{\omega_0} - \Delta T$$

where:
- t is the sample time;
- z=v t/2 is the position along the fiber;
- v is the velocity of light in the fiber;
- d(t) is the complex signal from the phase and amplitude receiver;
- I(t) is the modulated laser intensity;
- $\mathcal{F}$ denotes the Fourier transform;
- $\mathcal{F}^{-1}$ denotes the inverse Fourier transform;
- $\omega_0$ is the central frequency of the source; and
- $\Delta T$ is the difference between the delays before and after the sensing fiber.

Thus the change in optical path length can be determined by a deconvolution between the complex signal from the phase and amplitude receiver and the modulated laser intensity. A cross-correlation can be applied instead of a deconvolution if $|\mathcal{F}[I(t_j)]|^2 \approx$ constant.

In the case where the intensity modulation is pulsed, the change in optical path length can be determined directly from the phase of the complex signal, as measured at the phase and amplitude receiver:

$$\rho(t) \approx \frac{\text{phase}[d(t)]}{\omega_0} - \Delta T.$$

Applications

Possible uses of the systems and methods disclosed herein may include: distributed acoustic sensing on fiber or waveguides; surface vibrometry; distributed acoustic LIDAR in air and atmosphere; wind velocity measurement (anemometry); distributed acoustic LIDAR in water; distributed acoustic LIDAR in pipeline fluids; Vertical seismic profiling in boreholes and wells; Marine streamers for seismic exploration; Land seismic sensors for seismic exploration; Permanent seismic monitoring arrays for repeat seismic imaging and inversion; Passive seismic monitoring, such as earthquake monitoring, micro-seismic monitoring and induced seismicity related to underground fluid injection or production; Monitoring of mine wall stability, such as microseismic monitoring and caving; Monitoring of dam stability, such as water dam induced seismicity and stiffness of tailings dams; Pipeline monitoring, such as a leak detection and tampering; Perimeter and security monitoring/surveillance, such as intrusion detection; Infrastructure monitoring, such as strain and vibration control on bridges, tunnels, buildings and wind turbines; Vehicle structure monitoring, such as strain and vibration control in car, aeroplanes and ships; Flow measurement, such as metering flow in pipelines; Geotechnical surveys, such as surface wave inversion for of near surface shear wave velocity; Air movement profiling, such as atmospheric profiling, wind chamber profiling and around air vehicles; Water movement profiling, such as profiling oceanic currents, river flow and around marine vehicles; Medical devices, such as body strain sensors and blood flow measurements; Monitoring of telecommunication networks, such as disturbance and faults; Traffic and vehicle flow monitoring, such as roads, rail and boats; audio recording; and Fire monitoring, such as in tunnels and infrastructure.

Advantages

As will be appreciated by the skilled addressee from the disclosure herein, the systems and methods disclosed herein overcome limitations inherent in the systems taught by existing distributed acoustic sensing systems, including the advantages set out below.

Direct phase and amplitude measurement allows accurate determination of the rate and magnitude of optical path length changes in the sensing fiber with very high sensitivity. This also allows for a wider range of applications, such as machine condition monitoring, which are quantitative and beyond basic disturbance detection for security alerting. As a demonstration of sensitivity and fidelity, the systems disclosed herein experiments have been demonstrated to be able to acoustically record normal human voice and playback the recorded audio with fidelity comparable to a microphone recording.

Direct phase and amplitude measurement provides the ability to unambiguously distinguish between amplitude and phase changes of interfering light, which (in practical operation) overcomes erroneous measurements of the optical path length change, where such errors may be induced by attenuation effects, splices, connectors, non-linear effects (including the Kerr non-linear effect) in optical fibres.

The measurement of phase in full-quadrature ($2\pi$ range) and subsequent unwrapping eliminates any $\pi$ range ambiguity which would result in errors in sign and interpretation of a physical quantity, for example, causing ambiguity between compression and tension. Furthermore, it extends dynamic range of the systems disclosed herein by a factor of 2.

Direct phase and amplitude measurement overcomes the problem of the systems disclosed herein being prone to drifting into a state of total insensitivity during practical operation. This state of insensitivity occurs near specific phase values where a small phase-change does not produce a measurable interference-intensity change. A 3×3 coupler can be used just to create a relative phase bias of 120° between the optical fields on its output ports, thereby using the phase bias to select a higher slope region of the coupler's transfer-function in order to improve the sensitivity when the magnitude of the disturbance is small. However, this solution is not reliable in practical operation, as the bias requirements would drift with such factors as time; position along the fibre sensing medium; system parameters and environmental conditions.

Direct phase and amplitude measurement allows for coding and/or modulation schemes to be used with the systems disclosed herein to improve the system performance, including improving sensitivity and extending measurement range.

Direct phase and amplitude measurement avoids source intensity-noise corrupting the phase measurement and thereby the disturbance signal, which otherwise limits the signal-to-noise discrimination of the system.

Intentional intensity modulation of the source enables accurate distributed sensing in a sensing medium such as, for example, a sensing fiber. The systems and methods disclosed herein are not limited to the detection and location of a single disturbance in the sensing medium only and allow for disturbances to be categorised based on position, time or frequency.

The systems and methods disclosed herein also overcome the limitations inherent in existing c-OTDR and c-OFDR systems, for example: use of a broadband source significantly reduces cost, complexity and robustness of the system, without introducing phase noise, degrading sensitivity or limiting measurement range.

The systems and methods disclosed herein intrinsically and simultaneously average the distributed sensing signal for all optical frequencies present in the broadband source.

This is a key advantage when compared to existing narrowband/coherent c-OTDR and c-OFDR systems, as it greatly improves sensitivity, accuracy and linearity by eliminating issues associated with amplitude fading vs. position along the sensing fiber. The phenomenon of amplitude fading in narrowband/coherent c-OTDR and c-OFDR is fundamental to the random nature of Rayleigh backscatter, which results in random amplitudes and phases at each location along the fibre. This phenomenon is analogous to speckle on rough surfaces when illuminated with coherent light. At locations where the backscatter amplitude happens to be close to zero, the corresponding phase at these locations cannot be accurately determined or may be undefined when the amplitude is exactly equal to zero. Furthermore, near-zero amplitudes 'appear' as a sign change in the signal, which produces highly non-linear errors in any estimated phase change. These phase errors are a large and fundamental source of error in c-OTDR and c-OFDR DAS systems, which would then require the use of multiple narrowband, highly coherent laser sources in the system to overcome the limitations of amplitude fading; achieved by the exploiting the fact that each distinct laser wavelength produces a different, but random, realization of amplitudes and phases (i.e. a different speckle pattern). Averaging of phases with an amplitude-weighting, performed in digital signal processing, can reduce phase errors in the system since the phases measured at locations where the amplitude is near zero are largely ignored. The systems and methods disclosed herein utilize a sufficiently broadband source to ensure that there are no locations along the sensing fiber where backscatter amplitude may randomly occur near zero. This is achieved since, at each optical frequency, the phases at each location are not random (although the amplitudes are random), rather the phase at each location is proportional to the optical path length change (the desired measurement) and the delay difference. Therefore, each frequency of the optical source constructively contributes to the amplitude and phase at each location. The random amplitude pattern is then washed-out analogously to the elimination of speckle on a rough surface when using a sufficiently broadband source.

Use of a broadband optical source raises the optical power that can be used for sensing, since the power-threshold for unwanted non-linear effects is higher compared to coherent sources. Nonlinear effects with improved thresholds include; stimulated Brillouin scattering, four-wave mixing and modulation instability. Indeed, the systems and methods disclosed herein can be used even in the presence of strong nonlinear effects within the sensing medium as the effect of the nonlinear mechanism on the backscattered signal is deterministic in the low coherent regime and thus can be corrected for in the analysis of the coherently detected signal.

Arrangements of the systems and methods disclosed herein exhibit superior stability and robustness in uncontrolled environments and in the presence of vibration noise sources. This can be very important for reliable performance in outdoor applications with large machinery, such as seismic monitoring at oil-rigs and mine sites.

Generally, in c-OTDR and c-OFDR systems, phase noise in the source is unwanted, as it increases overall noise and therefore reduces the signal-to-noise of the system. This encourages the use of narrower-band and more highly coherent laser sources. The systems and methods disclosed herein teaches contrary to this situation. That is, simulations of systems and methods disclosed herein indicate that increasing the source bandwidth (linewidth) and encouraging greater incoherence (less coherence i.e. shorter coherence times and lengths) in the optical source will actually reduce noise and improve the signal-to-noise ratio contrary to conventional thinking. This is due to the fact that the incoherent interference between backscattered light returning from different sections of the sensing medium which are separated by more than the coherence length will create a background electronic (beating) noise which is spread out over the entire bandwidth of the source. Since this noise can have an electronic bandwidth larger than 1 THz, it can be very effectively filtered and removed from the signal.

Pulsing of the source has advantages over continuous wave sources which can "blind" the system during practical operation where strong reflections are present in the sensing medium. This is a common occurrence in optical fibre links involving 1 or more connectors or devices, which potentially makes existing distributed acoustic sensing systems unusable in a many practical cases.

Pulsing of the source improves signal-to-noise discrimination of the systems disclosed herein when the Direct+Direct and Delayed+Delayed backscatter signals arrive at different times to the Direct+Delayed and Delayed+Direct signals.

Distributed sensing can be achieved with the systems disclosed herein even in the limitation of having access to only one end of the sensing fiber, as opposed to Sagnac-type systems which requires access to both ends of the sensing fibre. This provides advantages in borehole and well applications, or other applications with constrained access.

Methods of polarization management presented herein avoid major inaccuracies caused by polarization stability of the laser, or polarization mode dispersion within optical components or the sensing medium.

The systems disclosed herein allow for implementation with optical fibre components, bulk optic components, micro-optics components and/or planar waveguide technologies for greater versatility in the implementation of the systems for many varied sensing applications.

Multiple sensing fibres (or available sensing media) can be connected to the system by means of wavelength division multiplexing since the broadband source has a plurality of optical wavelengths that can be used for independent sensing.

Interpretation

In Accordance With

As described herein, 'in accordance with' may also mean 'as a function of' and is not necessarily limited to the integers specified in relation thereto.

Embodiments/Arrangements

Reference throughout this specification to "one embodiment", "an embodiment", "one arrangement" or "an arrangement" means that a particular feature, structure or characteristic described in connection with the embodiment/arrangement is included in at least one embodiment/arrangement of the present invention. Thus, appearances of the phrases "in one embodiment/arrangement" or "in an embodiment/arrangement" in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more embodiments/arrangements.

Similarly it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments/arrangements described herein include some but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

SPECIFIC DETAILS

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the mobile device industries, specifically for methods and systems for distributing digital media via mobile devices.

It will be appreciated that the methods/apparatus/devices/systems described/illustrated above at least substantially provide improved systems and methods for quantitative distributed measurement of optical path length changes in an optically transparent medium.

The systems and methods described herein, and/or shown in the drawings, are presented by way of example only and are not limiting as to the scope of the invention. Unless otherwise specifically stated, individual aspects and components of the systems and methods described herein may be modified, or may have been substituted therefore known equivalents, or as yet unknown substitutes such as may be developed in the future or such as may be found to be acceptable substitutes in the future. The systems and methods described herein may also be modified for a variety of applications while remaining within the scope and spirit of the claimed invention, since the range of potential applications is great, and since it is intended that the present systems and methods described herein be adaptable to many such variations.

The claims defining the invention are as follows:

1. A distributed optical sensing system comprising:
   a sensing medium;
   an optical source for generating an optical output (OO);
   a means for separating the OO into at least two OO portions;
   a first optical delay means adapted to delay a first OO portion, named Delayed Optical Output Signal (Delay-OOS), by a delay time, $\tau_1$, with respect to a further OO portion, named Direct Optical Output Signal (DirectOOS);
   a means for directing the DelayOOS and the DirectOOS to the sensing medium;
   a means for receiving distributed backscatter signals from the sensing medium generated by the DelayOOS and the DirectOOS;
   a means for separating the received backscatter signals into at least two backscattered signal portions;
   a second optical delay means adapted to delay a first backscattered signal portion, named Delayed Backscatter Signal (DelayBS), by a delay time, $\tau_2$, with respect to a further backscattered signal portion, named Direct Backscatter Signal (DirectBS), wherein:
      one portion of the distributed backscatter generated by DirectOOS, having been received from the sensing medium, provides a portion of the DelayBS, named Direct-DelayBS; and
      one portion of the distributed backscatter generated by DelayOOS, having been received from the sensing medium, provides a portion of one or more DirectBS, named Delay-DirectBS;

an optical receiver configured for measurement of the phase difference between Direct-DelayBS and one or more Delay-DirectBS with full phase quadrature determination (without ambiguity in a range of 2*π radians) to determine optical path length changes along the sensing medium; and an analysis processor configured to receive measured signals from the optical receiver and analysis of the measured signals thereby to infer physical changes in the sensing medium from the sensed optical path length changes.

2. The system of claim 1, wherein the optical receiver is a phase and amplitude receiver adapted for measuring both amplitude and phase without ambiguity in a range of 2*π radians.

3. The system of claim 1, wherein the optical source is selected from one of an incoherent or low-coherence broadband optical source.

4. The system of claim 1, wherein the optical source is selected from one of a multi-wavelength or partially coherent optical source.

5. The system of claim 1, wherein the optical source has a coherence time, $\tau_{coh}$, and the delay of the first and second delay means satisfy the relation $|\tau_1-\tau_2|<a\, \tau_{coh}$, where a is between about 1 and about 100.

6. The system of claim 1, further comprising a modulator adapted to modulate at least a portion of the light generated by the optical source.

7. The system of claim 6, wherein the modulator is adapted to modulate the intensity, phase, frequency or polarisation of either the OO or the DirectOOS and/or DelayOOS prior to directing the output signals to the sensing medium.

8. The system of claim 1, wherein the first optical delay means and the second optical delay means are common, identical, and/or having approximately equal delay.

9. The system of claim 1, wherein the sensing medium is an optical fiber or one of a gas, liquid, water, sea water or atmospheric medium.

10. The system of claim 1, further comprising:
a plurality of sensing mediums;
frequency selection means for selecting a plurality of frequency bands within each of the DirectOOS and DelayOOS, each selected frequency band being directed to a selected medium;
a plurality of receiving means for receiving distributed backscatter from each selected optical medium combined to produce DelayBS and DirectBS;
frequency selection means for selecting a plurality of frequency bands within each of the Direct-DelayBS and Delay-DirectBS, each selected frequency band being directed to a selected phase and amplitude receiver; and
a plurality of phase and amplitude receivers adapted to measure differences in amplitude and phase of the received optical signals in the selected frequency bands to determine optical path length changes along each selected mediums.

11. A method of sensing optical path length changes in a sensing medium in a distributed manner comprising the steps of:
providing an optical source for generating an optical output (OO);
separating the OO into at least two portions;
providing a first optical delay means adapted to delay a first OO portion, named Delayed Optical Output Signal (DelayOOS), by a delay time, $\tau_1$, with respect to a further OO portion, named Direct Optical Output Signal (DirectOOS);
directing the DelayOOS and the DirectOOS into the sensing medium;
receiving distributed backscatter signals from the sensing medium generated by DelayOOS and DirectOOS;
separating the received distributed backscatter into at least two portions;
providing a second optical delay means adapted to delay a first backscattered signal portion, named Delayed Backscatter Signal (DelayBS), by a delay time, $\tau_2$, with respect to a further backscattered signal portion, named Direct Backscatter Signal (DirectBS), wherein:
one portion of the distributed backscatter generated by DirectOOS, having been received from the sensing medium, provides a portion of the DelayBS, named Direct-DelayBS; and
one portion of the distributed backscatter generated by DelayOOS, having been received from the sensing medium, provides a portion of one or more DirectBS, named Delay-DirectBS; and
measuring with full phase quadrature determination (without ambiguity in a range of 2*π radians) the phase difference between Direct-DelayBS and Delay-DirectBS to determine optical path length changes along the sensing medium.

12. The method of claim 11, wherein measuring with full phase quadrature determination is performed with a phase and amplitude receiver capable of measuring both amplitude and phase without ambiguity in a range of 2*π radians.

13. The method of claim 11, wherein the optical source is an incoherent or low-coherence broadband optical source.

14. The method of claim 11, wherein the optical source is either a multi-wavelength or a partially coherent optical source.

15. The method of claim 11, wherein said distributed backscatter is due to Rayleigh backscatter in an optical fiber.

16. The method of claim 11, wherein said distributed backscatter is due to backscatter in a non-guiding sensing medium such atmosphere, gasses, fluids, water or a marine environment.

17. The method of claim 11, wherein the optical source is an intensity modulated optical source or pulsed optical source.

18. The method of claim 11, further comprising the step of modulating either the OO or the DirectOOS and/or DelayOOS prior to directing the output signals to the sensing medium.

19. The method of claim 11, further comprising, prior to directing the output signals into the sensing medium, providing combining means for combining the DelayOOS and the at least one DirectOOS.

20. The method of claim 11, wherein the first optical delay means and the second optical delay means are common, identical, and/or having approximately equal delay.

21. The method of claim 18, further comprising the steps of:
determining the locations of the optical path length changes using the travel time of light in the sensing medium and the modulation scheme;
quantitatively determining optical path length changes in a distributed manner using the measured phase; and
inferring one or more physical changes in the sensing medium from the determined optical path length changes.

22. The method of claim 18, wherein the method of determining the locations of said optical path length changes or said physical parameter involves:
- a numerical deconvolution between a complex signal from a phase and amplitude receiver and a known or measured modulation; and/or
- a numerical cross-correlation between the complex signal from a phase and amplitude receiver and a known or measured modulation.

23. The method of claim 18, wherein the step of modulating comprises either modulating the intensity, modulating the amplitude, modulating the frequency, modulating the phase, or modulating the polarization of the optical signals.

24. The method of claim 11, wherein a time gating device is used to prevent light from entering the sensing medium at unwanted times.

25. The method of claim 11, further comprising the steps of:
- providing a first frequency selection means to:
- selecting a plurality of frequency bands within each of the DirectOOS and DelayOOS;
- directing each pair of optical signals in each selected frequency band to a selected one of a plurality of sensing mediums;
- receiving distributed backscatter optical signals from each selected optical medium;
- combining each of the received distributed backscatter optical signals to produce DirectBS and DelayBS;
- providing a second frequency selection means for selecting a plurality of frequency bands with Direct-DelayBS and Delay-DirectBS; and
- directing signals within each selected plurality of frequency bands to a selected one of a plurality of phase and amplitude receivers to measure the relative phase difference between Direct-DelayBS and Delay-DirectBS in each selected frequency band to determine optical path length changes in each of the plurality of sensing mediums.

* * * * *